United States Patent
Obuchi et al.

(10) Patent No.: US 9,811,092 B2
(45) Date of Patent: Nov. 7, 2017

(54) VEHICLE TRAVELING CONTROL DEVICE

(71) Applicant: TOYOTA JIDOSHA KABUSHIKI KAISHA, Toyota-shi, Aichi-ken (JP)

(72) Inventors: Masashi Obuchi, Gotemba (JP); Koji Taguchi, Isehara (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/079,843

(22) Filed: Mar. 24, 2016

(65) Prior Publication Data

US 2016/0292998 A1    Oct. 6, 2016

(30) Foreign Application Priority Data

Mar. 31, 2015  (JP) ................. 2015-072777

(51) Int. Cl.
| | | |
|---|---|---|
| G05D 1/02 | (2006.01) |
| G08G 1/015 | (2006.01) |
| G08G 1/07 | (2006.01) |
| G08G 1/16 | (2006.01) |
| G08G 1/00 | (2006.01) |

(52) U.S. Cl.
CPC ........... *G05D 1/0287* (2013.01); *G08G 1/015* (2013.01); *G08G 1/075* (2013.01); *G08G 1/163* (2013.01); *G08G 1/166* (2013.01); *G08G 1/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,077,077 | B2* | 12/2011 | Sakuma | G01S 5/0072 342/70 |
| 9,539,989 | B2* | 1/2017 | Yamashiro | B60T 7/22 |
| 2007/0021904 | A1* | 1/2007 | Kawamata | G08G 1/161 701/532 |
| 2010/0021011 | A1* | 1/2010 | Shida | B60R 1/00 382/104 |
| 2011/0118967 | A1 | 5/2011 | Tsuda | |
| 2013/0110343 | A1 | 5/2013 | Ichikawa et al. | |
| 2013/0279491 | A1* | 10/2013 | Rubin | G08G 1/166 370/347 |

(Continued)

FOREIGN PATENT DOCUMENTS

| | | |
|---|---|---|
| JP | 2011-162132 A | 8/2011 |
| JP | 5342556 B2 | 8/2013 |
| WO | 2011/158347 A1 | 12/2011 |

*Primary Examiner* — Thomas G Black
*Assistant Examiner* — Ana Thomas
(74) *Attorney, Agent, or Firm* — Sughrue Mion, PLLC

(57) ABSTRACT

A vehicle traveling control device includes: a communication unit that communicate with preceding vehicles; a position information acquisition unit that acquires position information on the preceding vehicles and following vehicles around a host vehicle with which the host vehicle can carry out vehicle-vehicle communication;
a number of vehicles calculation unit that calculates a reference number of vehicles and an estimated number of vehicles; and
a traveling control unit that causes the host vehicle to travel at the traveling position behind the following vehicle if the estimated number of vehicles is larger than the reference number of vehicles.

4 Claims, 14 Drawing Sheets

(56) References Cited

U.S. PATENT DOCUMENTS

2015/0254987 A1* 9/2015 Altintas ................ G01C 21/34
  701/409
2016/0267795 A1* 9/2016 Miyazawa ............... G08G 1/22
2016/0267796 A1* 9/2016 Hiroma .................... G08G 1/22

* cited by examiner

VEHICLE TRAVELING CONTROL DEVICE

INCORPORATION BY REFERENCE

The disclosure of Japanese Patent Application No. 2015-072777 filed on Mar. 31, 2015 including the specification, drawings and abstract is incorporated herein by reference in its entirety.

BACKGROUND OF THE INVENTION

1. Field of the Invention

The present invention relates to a vehicle traveling control device.

2. Description of Related Art

Japanese Patent No. 5342556 describes a device that acquires the information, acquired by a radar or a camera on a particular preceding vehicle traveling ahead of the vehicle, via vehicle-vehicle communication and, based on the acquired information, controls the traveling of the vehicle.

When information acquired by a preceding vehicle is used to increase reliability in the driving assistance or vehicle control of a vehicle, it is better to collect more information. It is therefore desired to acquire information from more preceding vehicles.

SUMMARY OF THE INVENTION

According to a first aspect of the present invention, a vehicle traveling control device includes:
a communication unit configured to carry out vehicle-vehicle communication with preceding vehicles;
a position information acquisition unit configured to acquire position information on the preceding vehicles and following vehicles around a host vehicle, the host vehicle being able to carry out vehicle-vehicle communication with the preceding vehicles;
a number of vehicles calculation unit configured to calculate a reference number of vehicles and an estimated number of vehicles based on the position information acquired by the position information acquisition unit and a communication range of the communication unit, the reference number of vehicles being a number of the preceding vehicles with which the host vehicle can carry out vehicle-vehicle communication, the estimated number of vehicles being a number of the preceding vehicles, with which the host vehicle can carry out vehicle-vehicle communication, on the assumption that the host vehicle will travel at a traveling position behind each of the following vehicles; and
a traveling control unit configured to cause the host vehicle to travel at the traveling position behind the following vehicle if the estimated number of vehicles is larger than the reference number of vehicles.

In the first aspect, the number of vehicles calculation unit calculates the reference number of vehicles and the estimated number of vehicles, based on the position information acquired by the position information acquisition unit and the communication range of the communication unit. The reference number of vehicles is the number of the preceding vehicles with which the host vehicle can carry out vehicle-vehicle communication. The estimated number of vehicles is the number of the preceding vehicles, with which the host vehicle can carry out vehicle-vehicle communication, on the assumption that the host vehicle will travel at a traveling position behind each of the following vehicles. The traveling control unit causes the host vehicle to travel at the traveling position behind the following vehicle if the estimated number of vehicles is larger than the reference number of vehicles. Therefore, this vehicle traveling control device makes it possible for the vehicle to travel at the traveling position where the number of preceding vehicles, with which the vehicle can carry out vehicle-vehicle communication, is larger than the number of preceding vehicles at the original traveling position, thus allowing the vehicle to acquire information from more preceding vehicles.

According to a second aspect of the present invention, a vehicle traveling control device includes:
a communication unit configured to carry out vehicle-vehicle communication with preceding vehicles;
a position information acquisition unit configured to acquire position information on the preceding vehicles and following vehicles around a host vehicle, the host vehicle being able to carry out vehicle-vehicle communication with the preceding vehicles;
a number of vehicles calculation unit configured to calculate a number of the preceding vehicles with which the host vehicle can carry out vehicle-vehicle communication based on the position information acquired by the position information acquisition unit and a communication range of the communication unit; and
a traveling control unit configured to cause the host vehicle to travel based on a calculation result of the number of vehicles calculation unit wherein
the number of vehicles calculation unit is configured to calculate an estimated number of vehicles if a reference number of vehicles is smaller than a predetermined threshold and if there is at least one following vehicle with which the host vehicle can carry out vehicle-vehicle communication, the reference number of vehicles being a number of the preceding vehicles with which the host vehicle can carry out vehicle-vehicle communication, the estimated number of vehicles being a number of the preceding vehicles, with which the host vehicle can carry out vehicle-vehicle communication, on the assumption that, at a traveling position behind each of the following vehicles, the host vehicle will travel at the traveling position, and
the traveling control unit is configured to cause the host vehicle to travel at the traveling position where the estimated number of vehicles is a maximum and is larger than the reference number of vehicles, or at the traveling position where the estimated number of vehicles is equal to or larger than the predetermined threshold.

In the second aspect, the number of vehicles calculation unit calculates the estimated number of vehicles. The estimated number of vehicles is the number of the preceding vehicles, with which the host vehicle can carry out vehicle-vehicle communication, on the assumption that, at a traveling position behind each of the following vehicles, the host vehicle will travel at the traveling position, if the reference number of vehicles, which is the number of the preceding vehicles with which the host vehicle can carry out vehicle-vehicle communication, is smaller than a predetermined threshold and if there is at least one following vehicle with which the host vehicle can carry out vehicle-vehicle communication. The traveling control unit causes the host vehicle to travel at the traveling position where the estimated number of vehicles is the maximum and is larger than the reference number of vehicles or at the traveling position where the estimated number of vehicles is equal to or larger than the predetermined threshold. Therefore, the vehicle traveling control device makes it possible for the vehicle to travel at the traveling position where the number of preceding vehicles, with which the vehicle can carry out vehicle-vehicle communication, is larger than the number of preceding vehicles at the original traveling position, thus allowing the vehicle to acquire information from more preceding vehicles.

In the first aspect or the second aspect described above, the vehicle traveling control device may further include a vehicle type information acquisition unit configured to acquire vehicle type information on other vehicles around the host vehicle wherein the position information acquisition unit may be configured to further acquire position information on the other vehicles around the host vehicle and the number of vehicles calculation unit may be configured to change the communication range using the position information and vehicle type information on the other vehicles. This vehicle traveling control device changes the communication range at each traveling position using the position information and vehicle type information on the other vehicles, thus increasing accuracy in the estimated number of vehicles.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
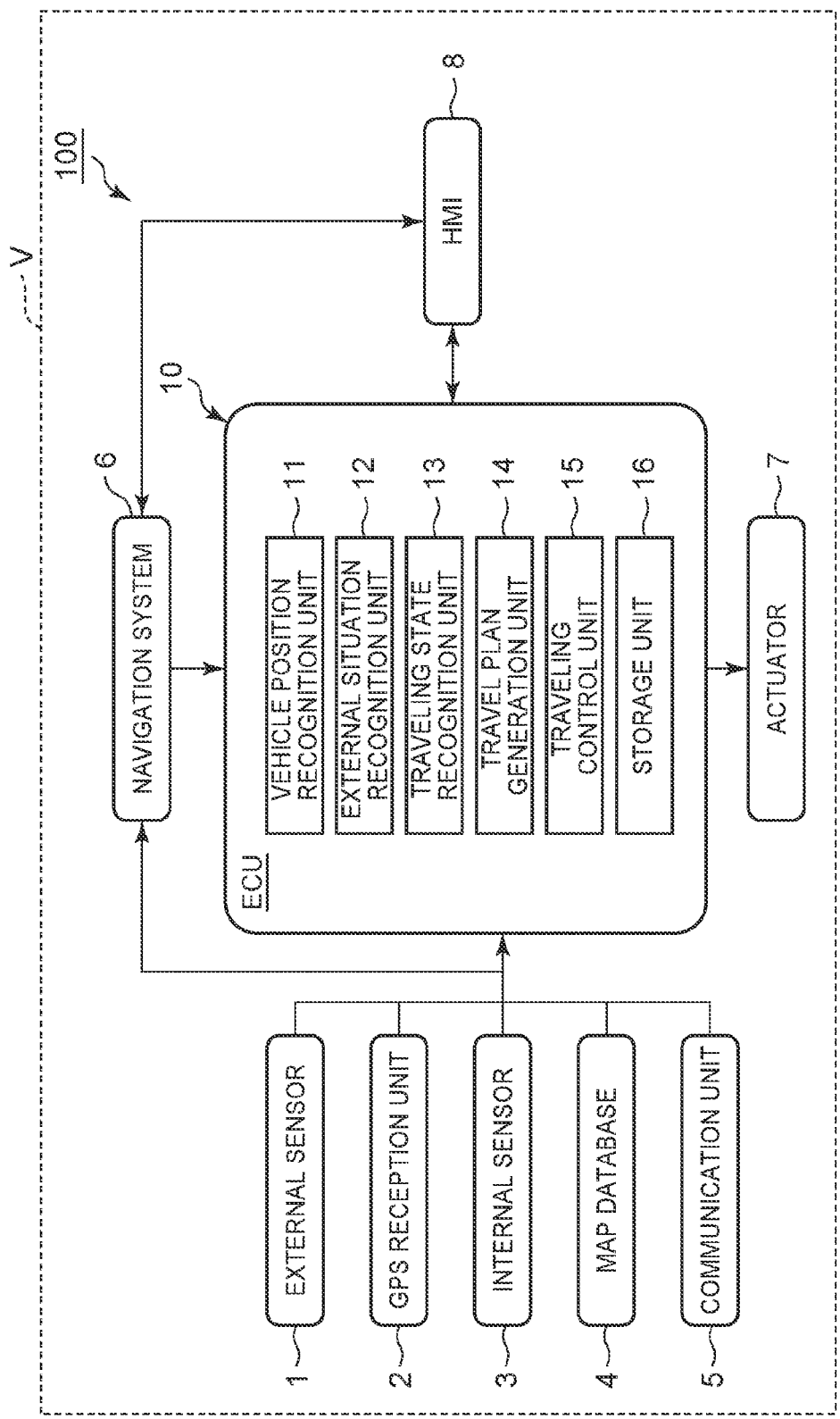
FIG. 1 is a block diagram showing the configuration of a vehicle having a vehicle traveling control device in an embodiment.

Embodiments of the present invention are described below with reference to the drawings. In the description below, the same reference numeral is used for the same or equivalent component and the redundant description is not repeated.

FIG. 1 is a block diagram showing the configuration of a vehicle V having a vehicle traveling control device in an embodiment. As shown in FIG. 1, the vehicle V such as a passenger car has a vehicle system 100 mounted thereon. The vehicle system 100 is a system that acquires the information, acquired by preceding vehicles traveling ahead, and in the traveling direction, of the vehicle V, via vehicle-vehicle communication for use in driving assistance or traveling control. As will be described later, the vehicle system 100 includes a vehicle traveling control device 20 in a first embodiment for controlling the traveling position of the vehicle V. The configuration of the vehicle system 100 is described below.

The vehicle system 100 includes an external sensor 1, a Global Positioning System (GPS) reception unit 2, an internal sensor 3, a map database 4, a communication unit 5, a navigation system 6, an actuator 7, a Human Machine Interface (HMI) 8, and an Electronic Control Unit (ECU) 10.

The external sensor 1 is a detection apparatus for detecting the external situation that is the surrounding information on the vehicle V. The external sensor 1 includes at least one of a camera, a radar, and a Laser Imaging Detection and Ranging (LIDAR).

The camera is a capturing apparatus that captures the external situation of the vehicle V. The camera is provided, for example, on the interior side of the windshield of the vehicle V. The camera may be a monocular camera or a stereo camera. The stereo camera includes two capturing units arranged so that the disparity between the right eye and the left eye can be reproduced. The information captured by the stereo camera also includes the depth direction information. The camera outputs the captured information on the external situation of the vehicle V to the ECU 10.

The radar detects an object outside the vehicle V using a radio wave. For example, the radio wave is a millimeter wave. The radar detects an object by sending a radio wave to the surroundings of the vehicle V and by receiving the radio wave reflected by an object. The radar can output the distance to, or direction of, an object as the object information. The radar outputs the detected object information to the ECU 10. When sensor fusion is performed in a subsequent stage, the reception information on the reflected radio wave may be output to the ECU 10.

The LIDAR detects an object outside the vehicle V using light. The LIDAR measures the distance to a reflection point and detects an object by sending light to the surroundings of the vehicle V and by receiving light reflected by the object. The LIDAR can output the distance to, or the direction of, an object as the object information. The LIDAR sends the detected object information to the ECU 10. When sensor fusion is performed in a subsequent stage, the reception information on the reflected light may be output to the ECU 10. Two or more of the camera, LIDAR, and radar need not necessarily be installed.

The GPS reception unit 2 receives signals from three or more GPS satellites to acquire the position information indicating the position of the vehicle V. The position information includes the longitude and the latitude. The GPS reception unit 2 outputs the measured position information on the vehicle V to the ECU 10. It should be noted that, instead of the GPS reception unit 2, another unit capable of identifying the longitude and latitude of the position of the vehicle V may be used.

The internal sensor 3 is a detection apparatus that detects the information according to the traveling state of the vehicle V and the information according to the driver's driving operation of the vehicle V (driving operation information). The internal sensor 3 includes at least one of a vehicle speed sensor, an acceleration sensor, and a yaw rate sensor for detecting the information according to the traveling state of the vehicle V.

The vehicle speed sensor is a detection apparatus that detects the speed of the vehicle V. For example, as the vehicle speed sensor, a wheel speed sensor is used. The wheel speed sensor is provided on the wheels of the vehicle V or on a component such as the drive shaft, which rotates in synchronization with the wheels, to detect the rotation speed of the wheels. The vehicle speed sensor outputs the vehicle speed information (wheel speed information), which includes the speed of the vehicle V, to the ECU 10.

The acceleration sensor is a detection apparatus that detects the acceleration of the vehicle V. For example, the acceleration sensor includes a longitudinal acceleration sensor that detects acceleration in the longitudinal direction of the vehicle V and a lateral acceleration sensor that detects the lateral acceleration of the vehicle V. The acceleration sensor outputs the acceleration information, which includes the acceleration of vehicle V, to the ECU 10.

The yaw rate sensor is a detection apparatus that detects the yaw rate (turning angle velocity) around the vertical axis at the center of gravity of the vehicle V. For example, a gyro sensor may be used as the yaw rate sensor. The yaw rate sensor outputs the yaw rate information, which includes the yaw rate of the vehicle V, to the ECU 10.

The map database 4 is a database that stores map information. For example, the map database 4 is formed in a hard disk drive (HDD) mounted on the vehicle V. The map information includes the position information on roads, the information on road shapes, and the position information on intersections and junctions. The information on a road shape includes the information on whether the road is a curved road or a straight road, the curvature of a curved road, and so on. In addition, when the vehicle system 100 uses the position information on shielding structures, such as a building or a wall, and the Simultaneous Localization and Mapping (SLAM) technology, the map information may include the output signal of the external sensor 1. The map database 4 may also be stored in a computer in facilities, such as an information processing center, that can communicate with the vehicle V.

The communication unit 5 carries out vehicle-vehicle communication with a preceding vehicle traveling ahead of the vehicle V. The preceding vehicle refers to a vehicle traveling on the road ahead, and in the traveling direction, of the vehicle V. The vehicle-vehicle communication refers to communication in which the vehicles directly exchange information with each other. The communication unit 5 is provided on the vehicle V so that the area ahead of the vehicle V becomes a communication range. The communication range, a range in which data can be exchanged among vehicles, is a range that can be calculated based on the specifications (communication frequency, output, antenna gain, and so on) of the communication unit 5. The information on the communication range is stored in advance in a storage unit 16 of the ECU 10 that will be described later. The communication unit 5 receives, via the vehicle-vehicle communication, the position information on a preceding vehicle with which vehicle-vehicle communication can be carried out, the external situation recognized by the preceding vehicle (the information acquired by the external sensor of the preceding vehicle), and the vehicle information on the preceding vehicle. The external situation includes the information corresponding to the map information described above, the information on a construction site on the road, the accident information on the road, and the information on the road condition such as the information on snow. The vehicle information includes the information acquired by the internal sensor of the preceding vehicle (for example, speed, acceleration, and yaw rate). The external situation recognized by the preceding vehicle and the vehicle information on the preceding vehicle are used in the driving assistance or vehicle control of the vehicle V.

The communication unit 5 communicates also with a vehicle other than the preceding vehicle. For example, the communication unit 5 carries out vehicle-vehicle communication with a following vehicle traveling behind the vehicle V with which the vehicle V can carry out vehicle-vehicle communication. The communication unit 5 is provided on the vehicle V so that the area behind the vehicle V becomes a communication range. A following vehicle refers to a vehicle that travels on the road behind the vehicle V. The communication unit 5 receives the position information on the following vehicle with which the vehicle V can carry out vehicle-vehicle communication as well as the vehicle information on the following vehicle via vehicle-vehicle communication. The external situation, recognized by the following vehicle, and the vehicle information on the following vehicle may be used in the driving assistance or vehicle control of the vehicle V. A vehicle traveling parallel to the vehicle V may be determined to be either the preceding vehicle or the following vehicle according to a predetermined criterion. The communication unit 5 sends the acquired information to the ECU 10.

The above-described position information on the vehicles, which are around the vehicle V and with which vehicle-vehicle communication can be carried out, may be acquired by a communication unit other than the communication unit 5 that carries out vehicle-vehicle communication. For example, the vehicle V may have a communication unit that carries out road-vehicle communication. That is, via road-vehicle communication, the vehicle V may receive the above-described position information on the vehicles around the vehicle V with which the vehicle V can carry out vehicle-vehicle communication. As described above, the information that the vehicle traveling control device 20, which will be described later, uses for determining the traveling position of the vehicle V may be acquired via either vehicle-vehicle communication or road-vehicle communication.

The navigation system 6 is a device that guides the driver of the vehicle V to the destination that is set on the map by the driver of the vehicle V. The navigation system 6 calculates a route, along which the vehicle V will travel, based on the position information on the vehicle V measured by the GPS reception unit 2 and the map information stored in the map database 4. The route may be a route that identifies a traveling lane, in which the vehicle V will travel, in a multiple-lane area. The navigation system 6 calculates a target route, from the position of the vehicle V to the destination, and informs the driver about the calculated target route through display on the display device or through voice output from the speaker. The navigation system 6 outputs the information on the target route of the vehicle V to the ECU 10. The navigation system 6 may use information stored in a computer in facilities, such as an information processing center, that can communicate with the vehicle V.

A part of the processing to be performed by the navigation system 6 may also be performed by the computer in the facilities.

The actuator 7 is a device that performs the traveling control of the vehicle V. The actuator 7 includes at least a throttle actuator, a brake actuator, and a steering actuator. The throttle actuator controls the amount of air to be supplied to the engine (throttle angle) according to the control signal from the ECU 10 to control the driving force of the vehicle V. When the vehicle V is a hybrid vehicle or an electric vehicle, the actuator 7 does not include a throttle actuator and, in this case, the control signal is input from the ECU 10 to the motor, which is the source of power, to control the driving force.

The brake actuator controls the brake system according to the control signal, received from the ECU 10, to control the controlling force to be applied to the wheels of the vehicle V. As the brake system, a hydraulic brake system may be used. The steering actuator controls the driving of the assist motor, one component of the electric power steering system for controlling the steering torque, according to the control signal received from the ECU 10. By doing so, the steering actuator controls the steering torque of the vehicle V.

The HMI 8 is an interface for outputting and inputting information between the occupants (including the driver) of the vehicle V and the vehicle system 100. The HMI 8 has a display panel for displaying image information to the occupants, a speaker for outputting voices, and operation buttons or a touch panel for allowing the occupants to perform input operations. The HMI 8 may include the autonomous driving ON/OFF switch. This switch is an input unit via which an occupant enters a request operation for starting autonomous driving. The autonomous driving ON/OFF switch may be configured to allow an occupant to enter a request operation for ending autonomous driving. In response to a request operation performed by an occupant to start or end autonomous driving, the autonomous driving ON/OFF switch outputs the information, which indicates the start of autonomous driving or the end of autonomous driving, to the ECU 10. The input unit is not limited to a switch but may be any unit via which the information, indicating the driver's intention to start or end autonomous driving, can be entered. For example, the input unit may be an autonomous driving start button, an autonomous driving end button, or the object of a switch or a button displayed on the screen for operation by the driver. When the vehicle reaches the destination where autonomous driving is to be ended, the HMI 8 informs the occupants that the vehicle will reach the destination. The HMI 8 may output information to the occupants using a wirelessly connected mobile information terminal or may receive an input operation from an occupant using a mobile information terminal.

The ECU 10 controls the vehicle V. The ECU 10 is an electronic control unit that includes a Central Processing Unit (CPU), a Read Only Memory (ROM), a Random Access Memory (RAM), and a Controller Area Network (CAN) communication circuit. The ECU 10, connected to a network on which communication is carried out using the CAN communication circuit, is connected to the above-described components of the vehicle V so that the ECU 10 can communicate with those components. For example, the ECU 10 causes the CAN communication circuit to operate based on the signal output from the CPU for inputting or outputting data, stores the input data in the RAM, loads a program stored in the ROM into the RAM, and executes the program loaded into the RAM. By performing this processing, the functions of the components of the ECU 10, which will be described later, are implemented. The ECU 10 may be configured by a plurality of electronic control units.

Figure 2:
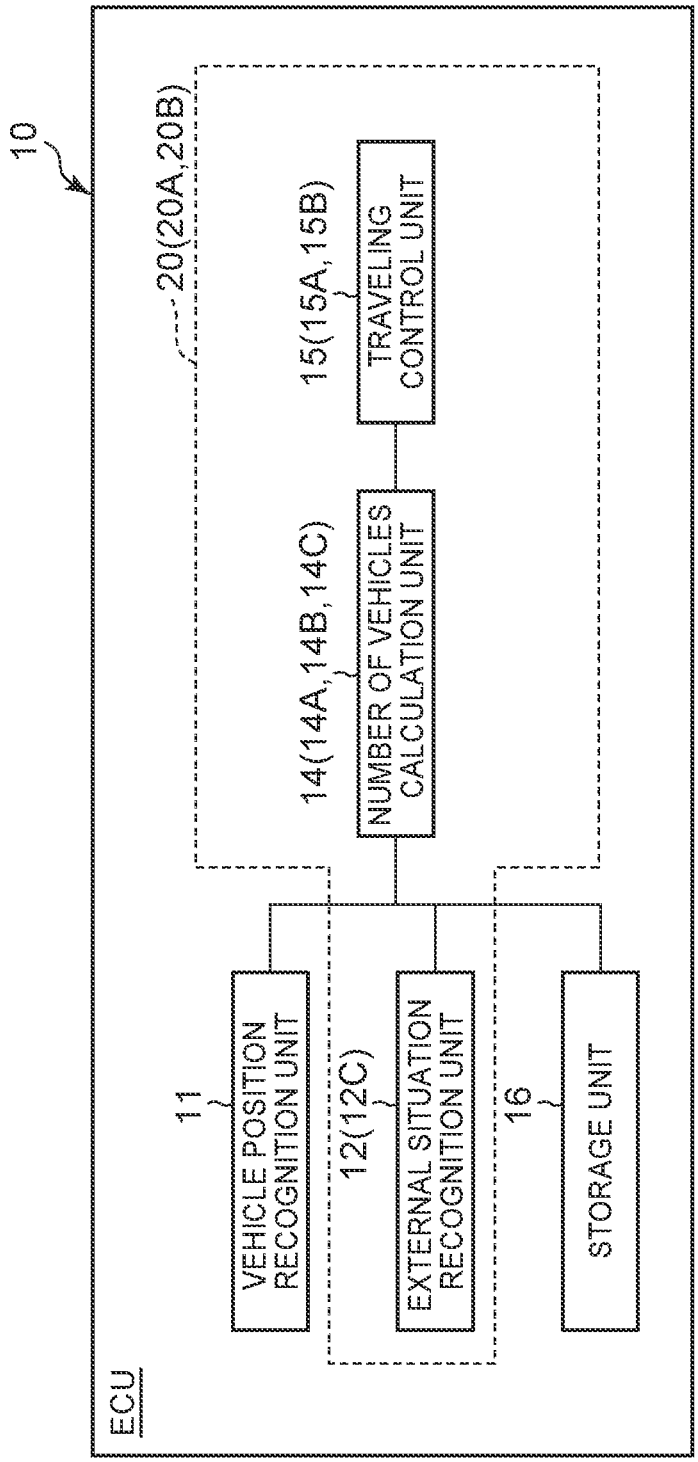
FIG. 2 is a block diagram showing the function of the vehicle traveling control device in the embodiment.

The ECU 10 includes a vehicle position recognition unit 11, an external situation recognition unit 12 (an example of position information acquisition unit), a traveling state recognition unit 13, a travel plan generation unit 14 (an example of number-of-vehicles calculation unit), a traveling control unit 15 (an example of traveling control unit), and the storage unit 16. FIG. 2 is a block diagram showing the function of the vehicle traveling control device 20 in the first embodiment. The vehicle traveling control device 20 is a device that controls the traveling of the vehicle V having the communication unit 5 that carries out vehicle-vehicle communication with a preceding vehicle that is traveling ahead of the vehicle. The vehicle traveling control device 20 determines the traveling position to acquire information from more preceding vehicles via vehicle-vehicle communication and causes the vehicle V to travel at the traveling position. For example, the vehicle traveling control device 20 is configured by including only the external situation recognition unit 12, travel plan generation unit 14, and the traveling control unit 15 but not the vehicle position recognition unit 11 and the traveling state recognition unit 13.

The vehicle position recognition unit 11 recognizes the position of the vehicle V (hereinafter called "vehicle position") on the map based on the position information on the vehicle V received by the GPS reception unit 2 and the map information stored in the map database 4. The vehicle position recognition unit 11 may also recognize the vehicle position by acquiring the vehicle position, which is used by the navigation system 6, from the navigation system 6. When the vehicle position of the vehicle V can be measured by a sensor installed outside the vehicle, for example, on the road, the vehicle position recognition unit 11 may acquire the vehicle position from this sensor via communication.

The vehicle position recognition unit 11 may compare the detection result, generated by the external sensor 1 and the internal sensor 3 (recognition result of the external situation recognition unit 12 and the recognition result of the traveling state recognition unit 13 that will be described later), with the map information to correct the vehicle position and direction of the vehicle V, acquired by the GPS reception unit 2, for higher accuracy.

The external situation recognition unit 12 recognizes the external situation of the vehicle V based on the detection result of the external sensor 1. The detection result includes the information captured by the camera, object information detected by the radar, and object information detected by the LIDAR. The external situation may include the positions of the white lines of the traveling lane in which the vehicle V travels or the position of the center of the lane, the road width, and the road shape. The road shape may be the curvature of the traveling lane and a change in the slope of the road surface and undulations efficiently used for the prospect estimation by the external sensor 1. The external situation may be the situation of objects such as an obstacle around the vehicle V. The obstacle situation may include the information for distinguishing between non-moving obstacles and moving obstacles, the position of an obstacle around the vehicle V, moving direction of an obstacle around the vehicle V, and relative speed of an obstacle around the vehicle V.

The external situation recognition unit 12 causes the communication unit 5, which carries out vehicle-vehicle communication, to acquire the information acquired by a vehicle ahead of the vehicle V with which the vehicle V can carry out vehicle-vehicle communication. The traveling control unit 15, which will be described later, uses the information acquired by a preceding vehicle to increase reliability in driving assistance or vehicle control.

In addition, the external situation recognition unit 12 acquires the position information on the preceding vehicles and the following vehicles around the vehicle V with which the vehicle V can carry out vehicle-vehicle communication. For example, the external situation recognition unit 12 causes the communication unit 5, which carries out vehicle-vehicle communication, to operate to acquire the position information on the vehicles ahead of or behind the vehicle V (preceding vehicles and following vehicles) with which the vehicle V can carry out vehicle-vehicle communication. The external situation recognition unit 12 may also cause a communication unit, which carries out road-vehicle communication, to operate to acquire the position information on the vehicles around the vehicle V with which the vehicle V can carry out vehicle-vehicle communication.

The traveling state recognition unit 13 recognizes the traveling state of the vehicle V based on the detection result of the internal sensor 3. The detection result of the internal sensor 3 includes the vehicle speed information detected by the vehicle speed sensor, acceleration information detected by the acceleration sensor, and yaw rate information detected by the yaw rate sensor. The information indicating the traveling state of the vehicle V includes the vehicle speed, acceleration, or yaw rate.

The travel plan generation unit 14 generates a course of the vehicle V. The course is a trajectory along which the vehicle V will travel on the target route. The travel plan generation unit 14 generates a course of the vehicle V based on the target route calculated by the navigation system 6, the vehicle position recognized by the vehicle position recognition unit 11, and the external situation (including the vehicle position and the direction) of the vehicle V recognized by the external situation recognition unit 12. The travel plan generation unit 14 generates a course so that the vehicle V travels on the target route while satisfying the criteria for safety, regulation compliance, and traveling efficiency. In addition, the travel plan generation unit 14 generates a course of the vehicle V in such a manner that the vehicle V will avoid contact with an object based on the situation of the objects around the vehicle V.

The target route described in this specification includes a traveling route generated automatically based on the external situation and the map information when the destination is not explicitly set by the driver, such as a road-following route in the "driving assistance device" described in Japanese Patent No. 5382218 (WO2011/158347) or in the "autonomous driving device" described in Japanese Patent Application Publication No. 2011-162132 (JP 2011-162132 A).

The travel plan generation unit 14 generates a travel plan according to the generated course. That is, the travel plan generation unit 14 generates a travel plan along the target route pre-set on the map in advance, based at least on the external situation that is the surrounding information on the vehicle V as well as on the map information stored in the map database 4. The travel plan generation unit 14 generates a travel plan that includes a plurality of sets, or configuration coordinates (p, v), each composed of two elements—the target position p and the speed v at each target point—in the coordinate system in which the course of the vehicle V is fixed to the vehicle V. Each of the plurality of target positions p at least has the information on the position of the x-coordinate or y-coordinate in the coordinate system fixed to the vehicle V or the information equivalent to that information. A travel plan, which is only required to include the information indicating the behavior of the vehicle V, is not limited to a plan including configuration coordinates. For example, as the information indicating the behavior of the vehicle V, a travel plan may include the target time t instead of the target speed v and, in addition, the information on the target time t and the direction of the vehicle V at that time.

In general, a travel plan is sufficiently represented by data indicating a plan in the future that is approximately several seconds from the current time. However, depending upon a situation, for example, a situation in which the vehicle will turn right at an intersection or the vehicle V will pass another vehicle, the data indicating a plan in several tens of seconds is required. Considering such a case, the number of configuration coordinates of a travel plan may be variable and the distance between configuration coordinates may be variable. In addition, the curve joining the neighboring configuration coordinates may be approximated by a spline function, and the parameters of the approximated curve may be used as a travel plan. To generate a travel plan, any known method that can describe the behavior of the vehicle V may be used.

A travel plan includes a control value used as the target value when the vehicle system 100 performs vehicle control. For example, a travel plan may be data indicating a change in the vehicle speed, acceleration/deceleration, and steering torque of the steering wheel of the vehicle V that will be applied when the vehicle V travels in a course along the target route. That is, a travel plan may include a speed pattern, an acceleration/declaration pattern, and a steering torque pattern of the vehicle V. The travel plan generation unit 14 may generate a travel plan so that the travel time (time required for the vehicle V to reach the destination) is minimized.

The speed pattern refers to data composed of target vehicle speeds each of which is set associated with the time at each of the target control positions that are set on the course at a predetermined interval (for example, 1 m). The acceleration/deceleration pattern refers to data composed of target accelerations/decelerations each of which is set associated with the time at each of the target control positions that are set on the course at a predetermined interval (for example, 1 m).

In addition, the travel plan generation unit 14 determines a traveling position of the vehicle V at a predetermined time and generates a travel plan that includes the traveling position. The traveling position, a position at which the vehicle V is traveling, is a relative position determined based on the positions of other vehicles. For example, the traveling position is identified by a relative relation such as a position ahead of a particular vehicle or a position behind a particular vehicle. That is, when assuming that the vehicles around the vehicle V form one vehicle group, the traveling position is the position of the vehicle V within the vehicle group.

First, the travel plan generation unit 14 calculates the number of preceding vehicles, with which the vehicle V can carry out vehicle-vehicle communication, as the reference number of vehicles. This reference number of vehicles is calculated based on the position information, obtained by the external situation recognition unit 12, on the vehicles around the vehicle V with which the vehicle V can carry out vehicle-vehicle communication and on the communication range of the communication unit 5. The position information indicates the current (calculation-time) position of a vehicle on the road. The information on the communication range is stored in advance in the storage unit 16 of the ECU 10. The reference number of vehicles is the number of vehicles used as the reference for determining whether to change the traveling position. For example, the reference number of vehicles is the number of preceding vehicles with which the vehicle V can carry out vehicle-vehicle communication at the current traveling position.

Figure 3:
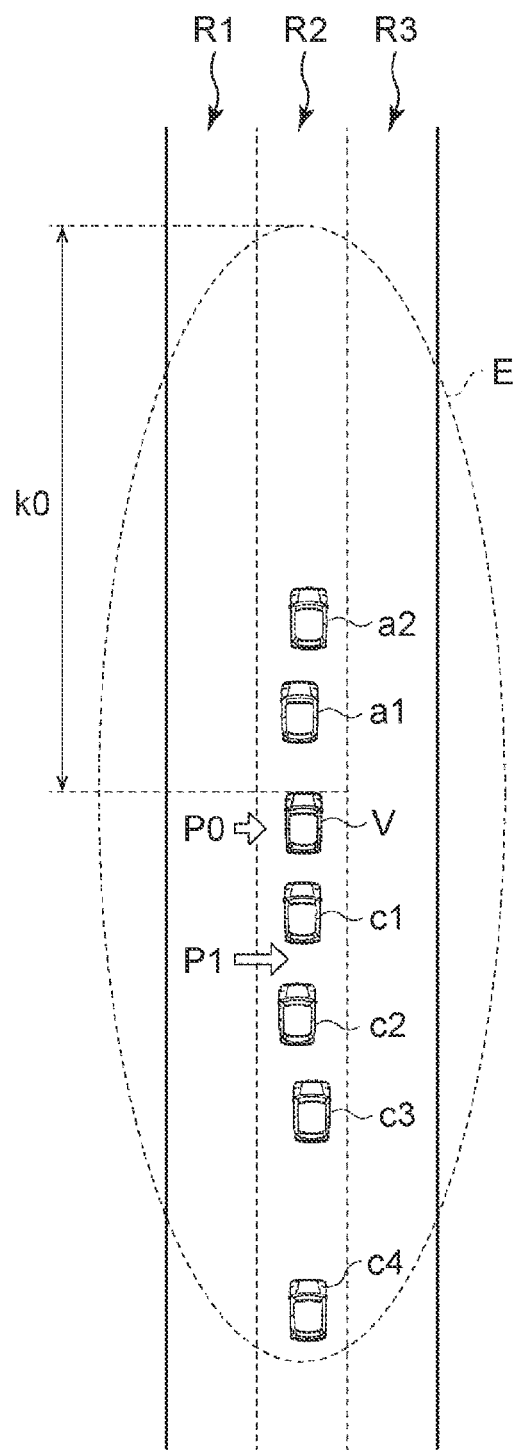
FIG. 3 is a diagram showing an example of the traveling position and the communication range of a vehicle.

FIG. 3 is a diagram showing an example of the traveling position and the communication range of the vehicle V. In FIG. 3, the vehicle V is traveling at the traveling position P0 on the road in which there are three lanes (lanes R1, R2, R3) in each direction. There is a total of two preceding vehicles (vehicles a2 and a1) ahead of the vehicle V with which the vehicle V can carry out vehicle-vehicle communication. There is a total of four following vehicles (vehicles c1 to c4) behind the vehicle V with which the vehicle V can carry out vehicle-vehicle communication. The communication range E extends a distance of k0 ahead in the traveling direction of the vehicle V.

In the traveling-vehicle arrangement state described above, the travel plan generation unit 14 uses the position information on the preceding vehicles (vehicles a2 and a1), obtained by the external situation recognition unit 12, to calculate the distance from the vehicle V to each of the preceding vehicles (vehicles a2 and a1). After that, the travel plan generation unit 14 compares each of the calculated distances with the communication distance k0, stored in the storage unit 16, to calculate the number of preceding vehicles (reference number of vehicles) with which the vehicle V can carry out vehicle-vehicle communication. In the example shown in FIG. 3, the travel plan generation unit 14 calculates that the reference number of vehicles is two.

Next, when there are one or more following vehicles behind the vehicle V with which the vehicle V can carry out vehicle-vehicle communication, the travel plan generation unit 14 calculates the number of preceding vehicles, with which the vehicle V can carry out vehicle-vehicle communication, as the estimated number of vehicles, on the assumption that the vehicle V will travel at the traveling position behind one of the following vehicles. The traveling position behind a following vehicle, which is the traveling position that is set with the following vehicle as the reference, is set within a predetermined distance behind the following vehicle. The traveling position behind the following vehicle includes not only the position immediately behind the following vehicle but also the position diagonally behind the following vehicle. The predetermined distance may be set considering the vehicle speed and the inter-vehicle distance of the following vehicle. For example, the traveling position may be set using a longer predetermined distance as the vehicle speed of the following vehicle is higher, or the midpoint of the inter-vehicle distance behind the following vehicle may be set as the traveling position. The estimated number of vehicles, which is the number of preceding vehicles with which the vehicle V can carry out vehicle-vehicle communication, is calculated on the assumption that the traveling position is changed. The estimated number of vehicles is calculated on the premise of the traveling-vehicle arrangement state described above. That is, the estimated number of vehicles is calculated based on the traveling-vehicle arrangement state at the time the reference number of vehicles is calculated.

In the example shown in FIG. 3, there is a following vehicle (vehicle c1) behind the vehicle V with which the vehicle V can carry out vehicle-vehicle communication. Therefore, the travel plan generation unit 14 calculates the number of preceding vehicles (estimated number of vehicles), with which the vehicle V can carry out vehicle-vehicle communication, on the assumption that the vehicle V will travel at the traveling position P1 that is behind the following vehicle (vehicle c1). The traveling position P1 that is behind the following vehicle (vehicle c1) is set within a predetermined distance with the following vehicle (vehicle c1) as the reference. The travel plan generation unit 14 uses the position information on the preceding vehicles (vehicles a2, a1, c1), obtained by the external situation recognition unit 12, to calculate the distance from the traveling position P1 to each of the preceding vehicles (vehicles a2, a1, c1). After that, the travel plan generation unit 14 compares each of the calculated distances with the communication distance k0, stored in the storage unit 16, to calculate the number of preceding vehicles (estimated number of vehicles) with which the vehicle V can carry out vehicle-vehicle communication. In this manner, the travel plan generation unit 14 calculates that the estimated number of vehicles is three.

If it is determined, based on the calculation result, that the estimated number of vehicles is larger than the reference number of vehicles, the travel plan generation unit 14 generates a travel plan that causes the vehicle V to travel at the traveling position behind the following vehicle. For example, because the reference number of vehicles is two and the estimated number of vehicles is three in the above example, the estimated number of vehicles is larger than the reference number of vehicles. Therefore, the travel plan generation unit 14 includes the traveling of the vehicle V at the traveling position P1, which is behind the following vehicle (vehicle c1), into the travel plan. In this manner, the travel plan generation unit 14 can determine a traveling position at a predetermine time as necessary and include the determined traveling position into the travel plan.

In the above example, the travel plan generation unit 14 determines only the traveling position P1 behind the following vehicle (vehicle c1) as the traveling position. The travel plan generation unit 14 may also determine the traveling position behind any of the following vehicles (vehicles c2, c3, and c4) as the traveling position.

The travel plan generation unit 14 generates a travel plan when the information indicating the start of autonomous driving is received from the autonomous driving ON/OFF switch. The travel plan generation unit 14 terminates the generation of a travel plan when the information indicating the end of autonomous driving is received from the autonomous driving ON/OFF switch. The travel plan generation unit 14 outputs the generated travel plan to the traveling control unit 15.

Figure 4:
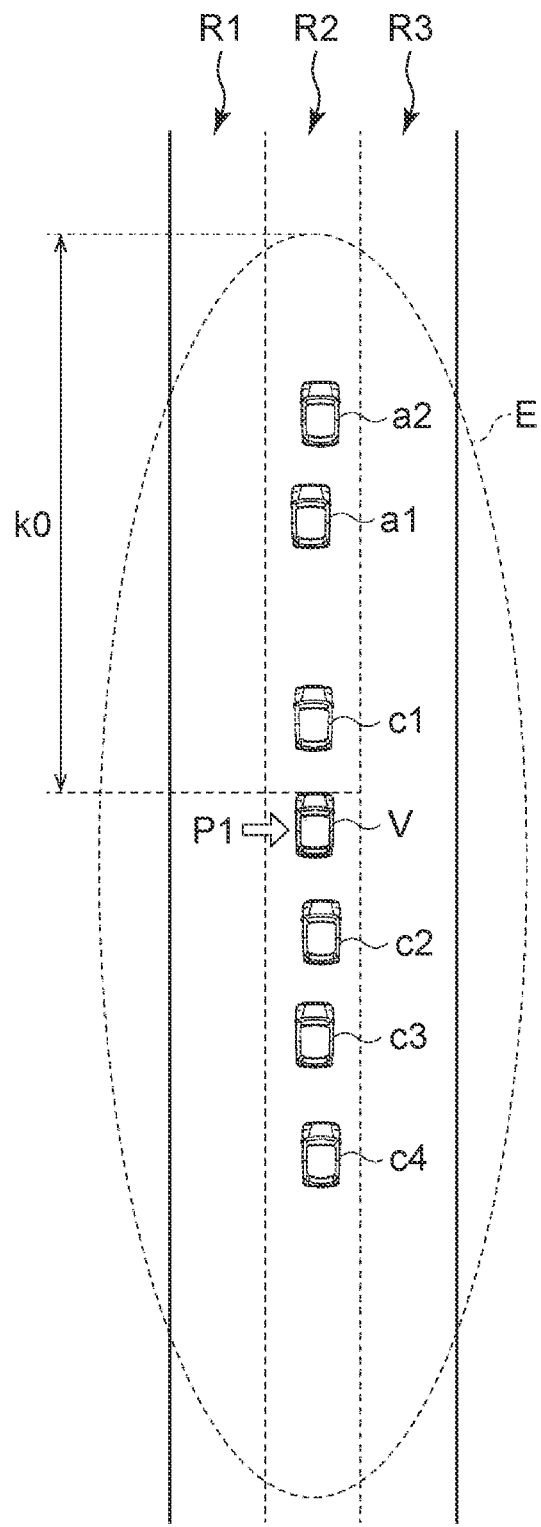
FIG. 4 is a diagram showing an example in which the traveling position of the vehicle shown in FIG. 3 is changed.

The traveling control unit 15 outputs the control signal to the actuator 7, based on the travel plan generated by the travel plan generation unit 14, to control the traveling of the vehicle V. FIG. 4 is a diagram showing an example in which the traveling position P0 of the vehicle shown in FIG. 3 is changed to the traveling position P1. As shown in this example, if the estimated number of vehicles is larger than the reference number of vehicles, the traveling control unit 15 causes the vehicle V to travel at the traveling position behind the following vehicle. The traveling control unit 15 causes the vehicle to travel autonomously (autonomous driving state) so that the vehicle travels at a traveling position where there are more preceding vehicles with which the vehicle can perform vehicle-vehicle communication. The autonomous driving state refers to the state in which the traveling of the vehicle V is controlled using a travel plan. That is, the autonomous driving state is the state in which the driver does not perform the steering operation and the vehicle V travels only under control of the vehicle system 100 with no intervention from the driver.

After the vehicle starts traveling at the traveling position determined by the travel plan generation unit 14, the traveling control unit 15 may end the autonomous driving state and put the vehicle V in the driving assistance state. The driving assistance state refers to the driving state in which the vehicle V travels in the mode of cooperation between the autonomous driving and the steering operation based on the travel plan and the operation amount of the steering operation. That is, the driving assistance state refers to the state in which both the driver and the vehicle system 100 can participate in the traveling of the vehicle V. In other words, the driving assistance state refers to the state in which the vehicle V travels based at least on the operation amount of the driver's steering operation while allowing the system to intervene in the steering operation as necessary.

As described above, the information acquired by the preceding vehicles may be used for the autonomous driving of the vehicle V or for the driving assistance of the vehicle V. In addition, the driving assistance is not limited to the traveling assistance of the vehicle V. Instead, the information acquired by the preceding vehicles may be informed to the driver of the vehicle V via the HMI 8. In either case, moving the vehicle V to a traveling position, where there are more preceding vehicles from which information can be acquired, results in an increase in the amount of information that can be acquired, further increasing reliability in the control of the vehicle V and in the assistance of the vehicle V.

Figure 5:
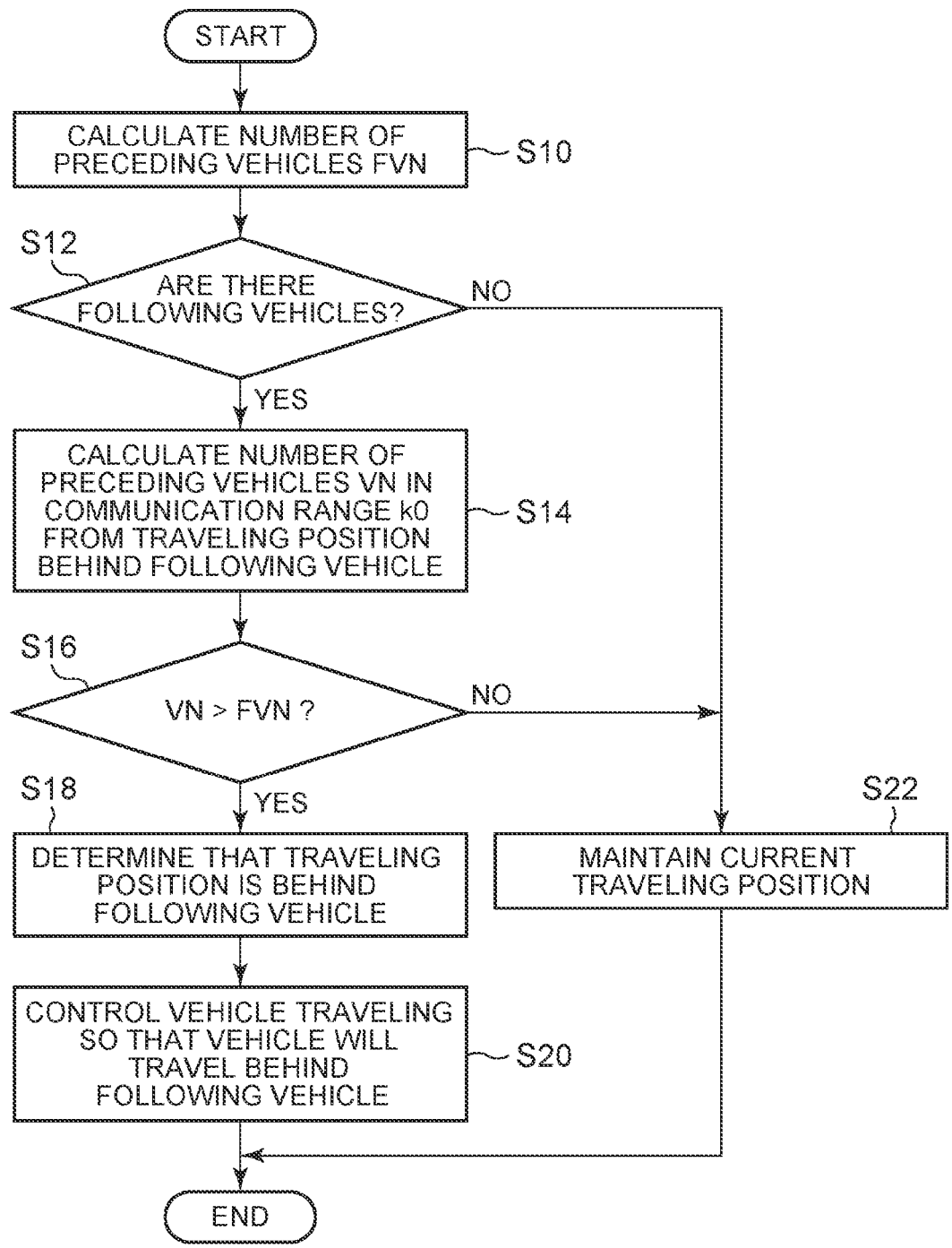
FIG. 5 is a flowchart showing an example of the vehicle traveling control processing in a first embodiment.

Next, the vehicle traveling control processing performed by the vehicle traveling control device 20 is described. FIG. 5 is a flowchart showing an example of the vehicle traveling control processing in the first embodiment. The vehicle traveling control processing shown in FIG. 5 is performed, for example, when the autonomous driving start request operation is input via the autonomous driving ON/OFF switch.

As shown in FIG. 5, the travel plan generation unit 14 first performs the reference-number-of-vehicles calculation processing in S10. That is, as the reference number of vehicles FVN, the travel plan generation unit 14 calculates the number of preceding vehicles, with which the vehicle V can carry out vehicle-vehicle communication, based on the following two. One is the position information, obtained by the external situation recognition unit 12, on the vehicles around the vehicle V with which the vehicle V can carry out vehicle-vehicle communication, and the other is the communication range of the communication unit 5 stored in the storage unit 16. For example, the external situation recognition unit 12 acquires the position information on the vehicles, which are ahead of the vehicle V and with which the vehicle V can carry out vehicle-vehicle communication, via the communication unit 5. After that, the travel plan generation unit 14 calculates the distance from the vehicle V to each of the preceding vehicles and compares each calculated distance with the communication distance k0, which is the communication range ahead of the vehicle V, to calculate the reference number of vehicles FVN. In the example shown in FIG. 3, the reference number of vehicles FVN is two (vehicles a2 and a1). When the reference-number-of-vehicles calculation processing is terminated, the processing proceeds to the following-vehicle determination processing (S12).

As the following-vehicle determination processing in S12, the travel plan generation unit 14 determines whether there are one or more following vehicles behind the vehicle V. For example, the travel plan generation unit 14 determines whether there are vehicles behind the vehicle V with which the vehicle V can carry out vehicle-vehicle communication, based on the position information, obtained by the external situation recognition unit 12, on the vehicles around the vehicle V with which the vehicle V can carry out vehicle-vehicle communication. In the example shown in FIG. 3, the travel plan generation unit 14 determines that there are the following vehicles c1 to c4. If it is determined that there are the following vehicles, the processing proceeds to the estimated-number-of-vehicles calculation processing (S14).

As the estimated-number-of-vehicles calculation processing in S14, the travel plan generation unit 14 calculates the estimated number of vehicles VN. As the estimated number of vehicles VN, the travel plan generation unit 14 calculates the number of preceding vehicles with which the vehicle V can carry out vehicle-vehicle communication on the assumption that the vehicle V will travel at the traveling position behind the following vehicle. If there is a plurality of following vehicles with which the vehicle V can carry out vehicle-vehicle communication, one of the following vehicles is selected according to a predetermined rule. For example, the following vehicle nearest to the vehicle V may be selected or the following vehicle most distant from the vehicle V may be selected. In the description below, the following vehicle nearest to the vehicle V is selected. For example, it is assumed that the vehicle V will travel at the traveling position P1 in FIG. 3 (traveling position behind the following vehicle c1). In this case, the travel plan generation unit 14 calculates the distance from the traveling position P1 to each of the preceding vehicles (vehicles a2, a1, c1) in the traveling-vehicle arrangement state shown in FIG. 3. After that, the travel plan generation unit 14 compares the calculated distance with the communication distance k0 (see storage unit 16), which is the communication range ahead of the vehicle V, to calculate the estimated number of vehicles VN of the preceding vehicles with which the vehicle V can carry out vehicle-vehicle communication. In this example, the travel plan generation unit 14 calculates the estimated number of vehicles VN as three. After the estimated-number-of-vehicles calculation processing is terminated, the processing proceeds to the number-of-vehicles comparison processing (S16).

The travel plan generation unit 14 compares the reference number of vehicles FVN and the estimated number of vehicles VN as the number-of-vehicles comparison processing in S16. For example, the travel plan generation unit 14 determines whether the estimated number of vehicles VN is larger than the reference number of vehicles FVN. In the example shown in FIG. 3, the travel plan generation unit 14 determines that the estimated number of vehicles VN (three vehicles) is larger than the reference number of vehicles FVN (two vehicles). If it is determined that the estimated number of vehicles VN is larger than the reference number of vehicles FVN, the travel plan generation unit 14 determines that the traveling position of the vehicle V should be the traveling position at the traveling position behind the following vehicle (S18) (for example, traveling position P1 in FIG. 3). After that, the processing proceeds to the vehicle traveling control processing (S20).

After that, as the vehicle traveling control processing in S20, the traveling control unit 15 controls the traveling of the vehicle V so that the vehicle V travels at the traveling position determined in the processing in S18. In the example shown in FIG. 3, the traveling control unit 15 controls the traveling of the vehicle V so that the vehicle V travels at the traveling position P1. For example, the travel plan generation unit 14 includes the traveling position, determined in the processing in S18, into the travel plan to allow the traveling control unit 15 to implement the control described above. The vehicle traveling control processing is performed to change the traveling position of the vehicle from the traveling position P0 to the traveling position P1 as shown in FIG. 3 and FIG. 4. After the vehicle traveling control processing is terminated, the vehicle traveling control processing shown in FIG. 5 is terminated.

On the other hand, if it is determined in the following-vehicle determination processing in S12 that there is no following vehicle with which the vehicle V can carry out vehicle-vehicle communication or if it is determined in the number-of-vehicles comparison processing in S16 that the estimated number of vehicles VN is not larger than the reference number of vehicles FVN, the traveling control unit 15 controls the vehicle so that the current traveling position is maintained. For example, the travel plan generation unit 14 includes the current traveling position into the travel plan to allow the traveling control unit 15 to implement the control described above. After the processing in S22 is terminated, the vehicle traveling control processing shown in FIG. 5 is terminated.

After the processing described above, the vehicle traveling control processing shown in FIG. 5 is terminated. According to the processing shown in FIG. 5, the traveling position is determined so that the number of preceding vehicles, with which the vehicle V can carry out vehicle-vehicle communication, increases and the vehicle control is performed so that the vehicle V travels at that traveling position. Therefore, the vehicle V can acquire information from more preceding vehicles.

The vehicle traveling control device 20 in the first embodiment described above performs the processing as follows. The travel plan generation unit 14 calculates the number of preceding vehicles, with which the vehicle V can carry out vehicle-vehicle communication, as the reference number of vehicles FVN, based on the position information acquired by the external situation recognition unit 12 and the communication range (communication distance k0) stored in the communication unit 5. At the same time, the travel plan generation unit 14 calculates the number of preceding vehicles, with which the vehicle V can carry out vehicle-vehicle communication, as the estimated number of vehicles VN on the assumption that the vehicle V will travel at the traveling position behind one of the following vehicles. If the estimated number of vehicles VN is larger than the reference number of vehicles FVN, the traveling control unit 15 causes the vehicle to travel at the traveling position behind the following vehicle. Therefore, the vehicle traveling control device 20 makes it possible for the vehicle V to travel at the traveling position where the number of preceding vehicles, with which the vehicle V can carry out vehicle-vehicle communication, is larger than the number of preceding vehicles at the original traveling position, thus allowing the vehicle V to acquire information from more preceding vehicles.

Next, a vehicle traveling control device in a second embodiment is described. In the description of this embodiment, the description of the configuration and the processing similar to those in the first embodiment is omitted and only the difference from the first embodiment is described.

A vehicle traveling control device 20A in this embodiment is different from the vehicle traveling control device 20 in the first embodiment only in the function of the travel plan generation unit 14 and the traveling control unit 15 of the ECU 10.

A travel plan generation unit 14A calculates the estimated number of vehicles if the reference number of vehicles, which is the number of preceding vehicles with which the vehicle V can carry out vehicle-vehicle communication, is smaller than a predetermined threshold and if there is at least one following vehicle behind the vehicle V with which the vehicle V can carry out vehicle-vehicle communication. The predetermined threshold is a threshold defined in advance for determining whether the number of preceding vehicles that provide information to the vehicle V is insufficient for performing the vehicle control or the driving assistance of the vehicle V, that is, whether there is a need to change the traveling position. The predetermined threshold may be an appropriate number of vehicles. The predetermined threshold is stored in advance in the storage unit 16.

Figure 6:
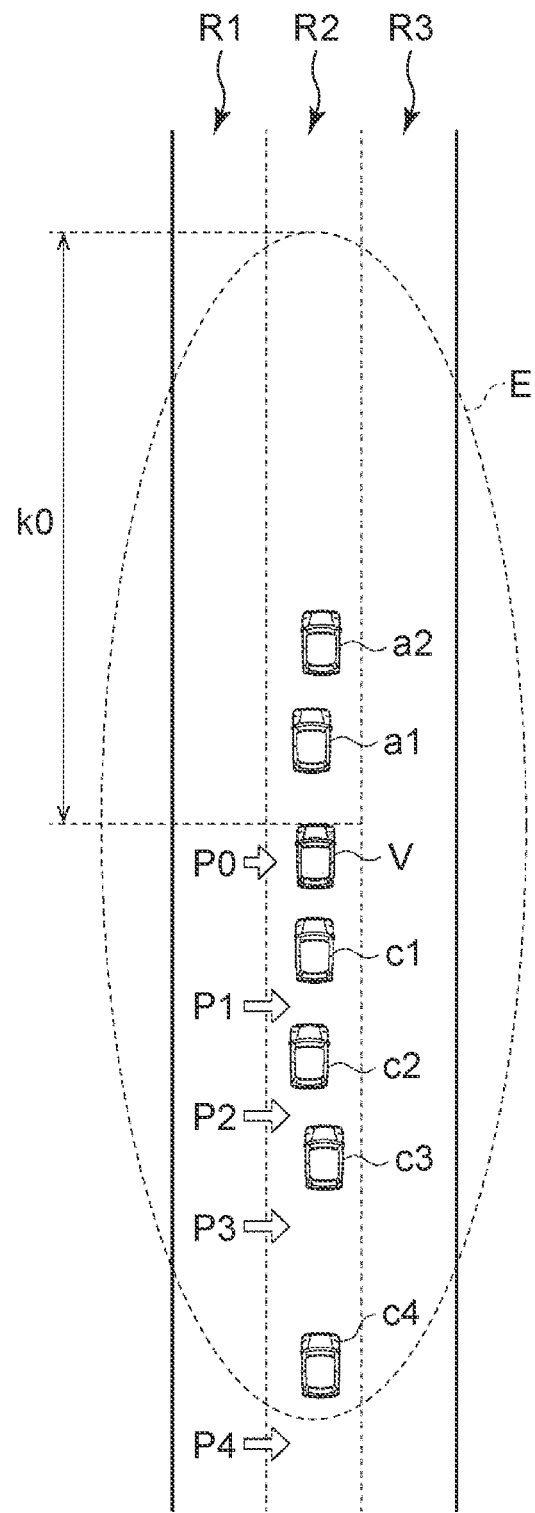
FIG. 6 is a diagram showing an example of the traveling position and the communication range of a vehicle.

FIG. 6 is a diagram showing an example of the traveling position and the communication range of a vehicle. In FIG. 6, the vehicle V is traveling at the traveling position P0 on the road in which there are three lanes (lanes R1, R2, and R3) in each direction as in FIG. 3. There is a total of two preceding vehicles (vehicles a2 and a1) ahead of the vehicle V with which the vehicle V can carry out vehicle-vehicle communication. There is a total of four following vehicles (vehicles c1 to c4) behind the vehicle V with which the vehicle V can carry out vehicle-vehicle communication. The communication range E extends a distance of k0 ahead in the traveling direction of the vehicle V.

In this traveling-vehicle arrangement state, the travel plan generation unit 14A uses the position information on the preceding vehicles (vehicles a2 and a1), obtained by the external situation recognition unit 12, to calculate the distance from the vehicle V to each of the preceding vehicles (vehicles a2 and a1). After that, the travel plan generation unit 14A compares each of the calculated distances with the communication distance k0, stored in the storage unit 16, to calculate the number of preceding vehicles (reference number of vehicles) with which the vehicle V can carry out vehicle-vehicle communication. In the example shown in FIG. 6, the travel plan generation unit 14A calculates that the reference number of vehicles is two. In this case, if the predetermined threshold is set to four, the travel plan generation unit 14A determines that the reference number of vehicles is smaller than the predetermined threshold. In addition, in the example shown in FIG. 6, there are a total of four following vehicles (vehicles c1 to c4) behind the vehicle V with which the vehicle V can carry out vehicle-vehicle communication. Therefore, the travel plan generation unit 14A determines that the condition is satisfied. That is, the reference number of vehicles, which is the number of preceding vehicles with which the vehicle V can carry out vehicle-vehicle communication, is smaller than the predetermined threshold and, at the same time, there is at least one following vehicle behind the vehicle V with which the vehicle V can carry out vehicle-vehicle communication. Based on this determination, the travel plan generation unit 14A calculates the estimated number of vehicles.

For each traveling position behind each of the following vehicles behind the vehicle V, the travel plan generation unit 14A calculates the number of preceding vehicles, with which the vehicle V can carry out vehicle-vehicle communication, as the estimated number of vehicles on the assumption that the vehicle V will travel at that traveling position. For example, as shown in FIG. 6, the travel plan generation unit 14A calculates the estimated number of vehicles at each of the traveling positions P1 to P4 each of which is behind one of the following vehicles (vehicles c1 to c4) behind the vehicle V. The traveling positions P1 to P4, each behind one of the following vehicles, are set with the respective following vehicle as the reference as in the first embodiment.

In the example shown in FIG. 6, because there is a following vehicle (vehicle c1) behind the vehicle V with which the vehicle V can carry out vehicle-vehicle communication, the travel plan generation unit 14A calculates the number of preceding vehicles (estimated number of vehicles), with which the vehicle V can carry out vehicle-vehicle communication, on the assumption that the vehicle V will travel at the traveling position P1 that is behind the following vehicle (vehicle c1). The traveling position P1 that is behind the following vehicle (vehicle c1) is set within a predetermined distance with the following vehicle (vehicle c1) as the reference.

The travel plan generation unit 14A uses the position information on the preceding vehicles (vehicles a2, a1, c1), obtained by the external situation recognition unit 12, to calculate the distance from the traveling position P1 to each of the preceding vehicles (vehicles a2, a1, c1). After that, the travel plan generation unit 14A compares each of the calculated distances with the communication distance k0, stored in the storage unit 16, to calculate the number of preceding vehicles (estimated number of vehicles) with which the vehicle V can carry out vehicle-vehicle communication. In the example shown in FIG. 6, the travel plan generation unit 14A calculates that the estimated number of vehicles is three. Similarly, the travel plan generation unit 14A performs the processing described above for each of the traveling positions P2 to P4 to calculate the estimated number of vehicles at each traveling position.

After that, the travel plan generation unit 14A determines the traveling position where the estimated number of vehicles is the maximum and is larger than the reference number of vehicles. For example, assume that the number of the preceding vehicles is three when the vehicle V travels at the traveling position P1, that the number of the preceding vehicles is four when the vehicle V travels at the traveling position P2, that the number of the preceding vehicles is five when the vehicle V travels at the traveling position P3, and that the number of the preceding vehicles is four when the vehicle V travels at the traveling position P4. In this case, the travel plan generation unit 14A selects the traveling position P3, where the estimated number of vehicles is the maximum (five), as the candidate. Then, the travel plan generation unit 14A determines whether the maximum of the estimated number of vehicles is larger than the reference number of vehicles. Because the reference number of vehicles in the example shown in FIG. 6 is two, the travel plan generation unit 14A determines that the traveling position P3, selected as the candidate, is the traveling position where the estimated number of vehicles is the maximum and is larger than the reference number of vehicles.

Figure 7:
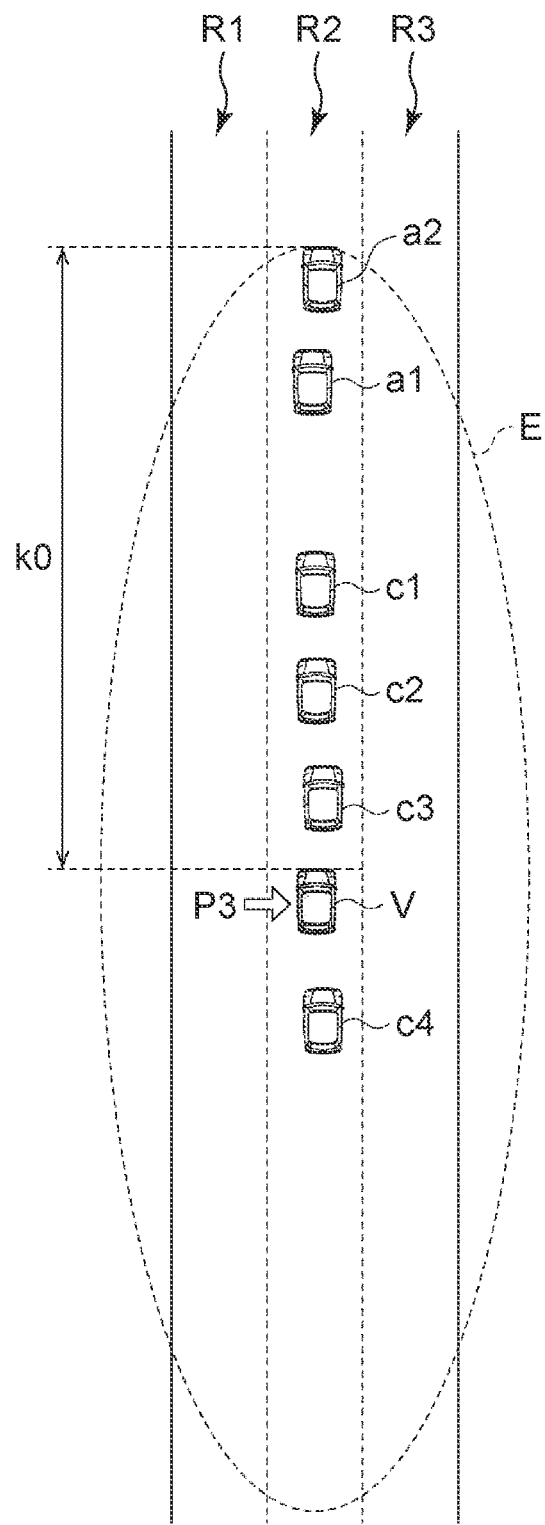
FIG. 7 is a diagram showing an example in which the traveling position of the vehicle shown in FIG. 6 is changed.

After that, the travel plan generation unit 14A generates a travel plan that causes the vehicle V to travel at the traveling position where the estimated number of vehicles is the maximum and is larger than the reference number of vehicles. Based on the travel plan generated by the travel plan generation unit 14A, a traveling control unit 15A outputs the control signal to the actuator 7 for controlling the traveling of the vehicle V. In the example shown in FIG. 6, the traveling control unit 15A performs control so that the vehicle V travels at the traveling position P3. For example, the travel plan generation unit 14A includes the traveling position P3 into the travel plan to allow the traveling control unit 15A to implement the control described above. FIG. 7 is a diagram showing an example in which the traveling position of the vehicle shown in FIG. 6 is changed. When the vehicle traveling control processing is performed, the traveling position of the vehicle is changed from the traveling position P0 to the traveling position P3 as shown in FIGS. 6 and 7. After the traveling position is changed in this way, the traveling control unit 15A causes the vehicle V to travel at the traveling position where the estimated number of vehicles is the maximum and is larger than the reference number of vehicles. In this manner, the traveling control unit 15A allows the vehicle V to travel at the traveling position where the number of preceding vehicles, with which the vehicle V can carry out vehicle-vehicle communication, is the maximum and is larger than that before the traveling position is changed.

Figure 8:
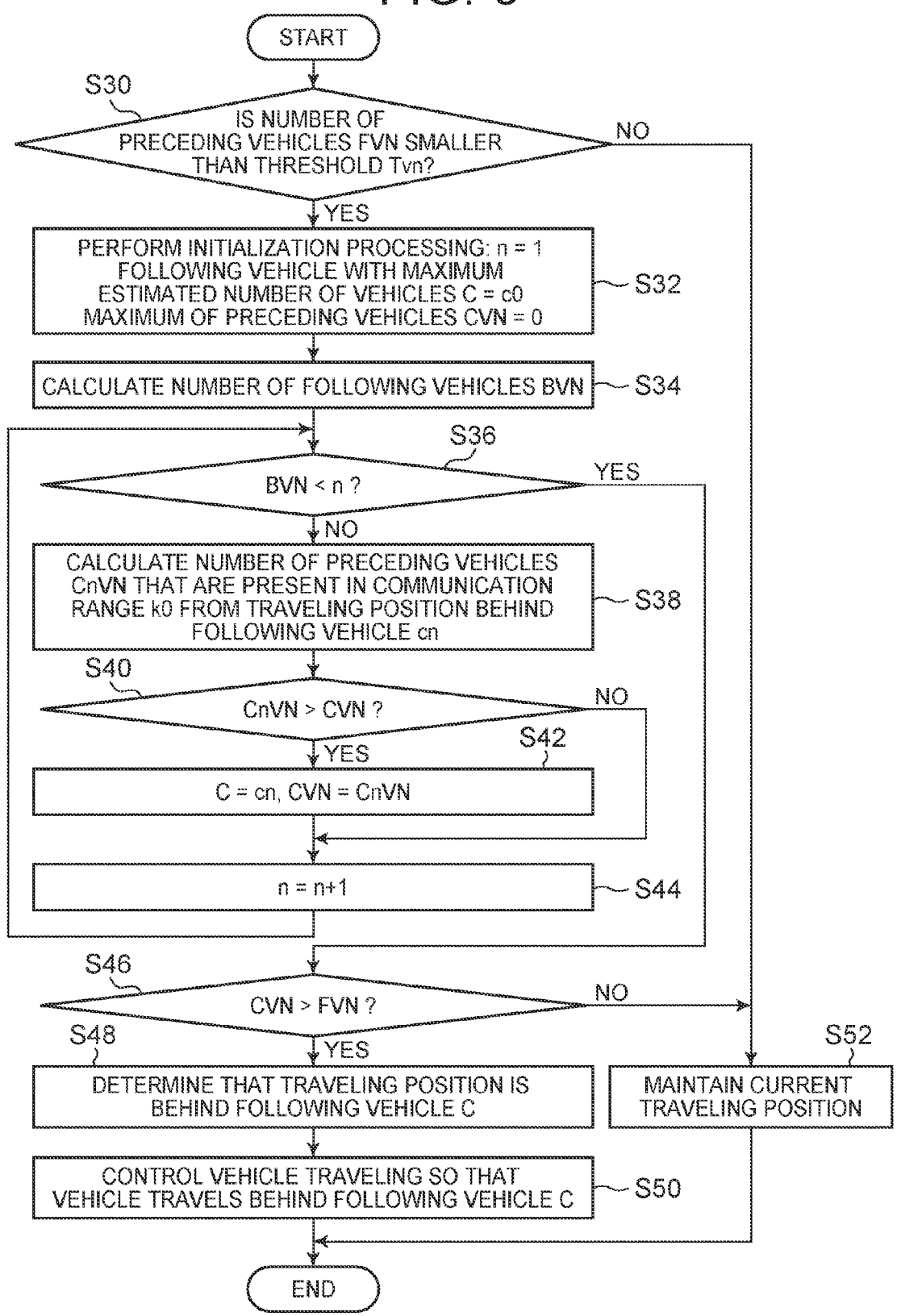
FIG. 8 is a flowchart showing an example of the vehicle traveling control processing in a second embodiment.

Next, the vehicle traveling control processing performed by the vehicle traveling control device 20A is described. FIG. 8 is a flowchart showing an example of the vehicle traveling control processing in the second embodiment. The vehicle traveling control processing shown in FIG. 8 is performed, for example, when the autonomous driving start request operation is input via the autonomous driving ON/OFF switch.

As shown in FIG. 8, the travel plan generation unit 14A first performs the reference-number-of-vehicles determination processing in S30. That is, as the reference number of vehicles FVN, the travel plan generation unit 14A calculates the number of preceding vehicles, with which the vehicle V can carry out vehicle-vehicle communication, based on the following two. One is the position information, obtained by the external situation recognition unit 12, on the vehicles around the vehicle V with which the vehicle V can carry out vehicle-vehicle communication, and the other is the communication range of the communication unit 5 stored in the storage unit 16. For example, the external situation recognition unit 12 acquires the position information on the vehicles, which are ahead of the vehicle V and with which the vehicle V can carry out vehicle-vehicle communication, via the communication unit 5. After that, the travel plan generation unit 14A calculates the distance from the vehicle V to each of the preceding vehicles and compares each calculated distance with the communication distance k0, which is the communication range ahead of the vehicle V, to calculate the reference number of vehicles FVN. In the example shown in FIG. 6, the reference number of vehicles FVN is two. Next, the travel plan generation unit 14A references the storage unit 16 to acquire the predetermined threshold Tvn and determines whether the reference number of vehicles FVN is smaller than the predetermined threshold Tvn. If it is determined in the reference-number-of-vehicles determination processing that the reference number of vehicles FVN is smaller than the predetermined threshold Tvn, the processing proceeds to the initialization processing (S32).

The travel plan generation unit 14A performs the initialization processing in S32 as follows. The travel plan generation unit 14A sets the variable n (integer) to 1. The variable n is a number used to calculate the estimated number of vehicles at each traveling position behind each of the following vehicles behind the vehicle V in the traveling-vehicle arrangement state existing when the reference number of vehicles FVN is calculated. Next, the travel plan generation unit 14A sets the following vehicle, which is the preceding vehicle immediately before the traveling position where the estimated number of vehicles is the maximum, to C with the initial value of c0. The initial value c0 indicates the preceding vehicle immediately before the current traveling position of the vehicle V (traveling position where the reference number of vehicles FVN is calculated). In the example shown in FIG. 6, the initial value c0 indicates the vehicle a1. That is, the state in which the following vehicle C remains the initial value of c0 at the calculation termination time indicates that the traveling position of the vehicle V is not changed. Next, the travel plan generation unit 14A sets the maximum number of preceding vehicles CVN to the initial value of 0. When the initialization processing is terminated, the processing proceeds to the number-of-following-vehicles calculation processing (S34).

As the number-of-following-vehicles calculation processing in S34, the external situation recognition unit 12 calculates the number of following vehicles BVN at the current traveling position of the vehicle V (traveling position where the reference number of vehicles is calculated). The external situation recognition unit 12 acquires the position information on the vehicles behind the vehicle V, with which the vehicle V can carry out vehicle-vehicle communication, via the communication unit 5 to count the number of following vehicles. In the example shown in FIG. 6, the number of following vehicles BVN at the traveling position P0 is four (vehicles c1 to c4). When the number-of-following-vehicles calculation processing is terminated, the processing proceeds to the following-vehicle determination processing (S36).

As the following-vehicle determination processing in S36, the travel plan generation unit 14A determines whether the number of following vehicles BVN, calculated by the number-of-following-vehicles calculation processing, is smaller than the variable n. The number of following vehicles BVN, if smaller than the initial value "1" of the variable n in the first following-vehicle determination processing, means that there is no following vehicle with which the vehicle V can carry out vehicle-vehicle communication. On the other hand, the number of following vehicles BVN, if not smaller than the initial value "1" of the variable n in the first following-vehicle determination processing, means that there is at least one following vehicle with which the vehicle V can carry out vehicle-vehicle communication. If it is determined in the following-vehicle determination processing that the number of following vehicles BVN is not smaller than the variable n, the processing proceeds to the estimated-number-of-vehicles calculation processing (S38).

As the estimated-number-of-vehicles calculation processing in S38, the travel plan generation unit 14A calculates the estimated number of vehicles CnVN. As the estimated number of vehicles CnVN, the travel plan generation unit 14A calculates the number of preceding vehicles, with which the vehicle V can carry out vehicle-vehicle communication, that are present on the assumption that the vehicle V will travel at the traveling position Pn behind the following vehicle cn. When n=1, the travel plan generation unit 14A assumes that the vehicle V will travel at the traveling position P1 in FIG. 6 (traveling position behind the following vehicle c1). In this case, the travel plan generation unit 14A calculates the distance from the traveling position P1 to each of the preceding vehicles (vehicles a2, a1, c1). After that, the travel plan generation unit 14A compares the calculated distance with the communication distance k0 that is the communication range ahead of the vehicle V (see the storage unit 16) to calculate the estimated number of preceding vehicles C1VN with which the vehicle V can carry out vehicle-vehicle communication. When n=1, the estimated number of vehicles C1VN in the example shown in FIG. 6 is three. When the estimated-number-of-vehicles calculation processing is terminated, the processing proceeds to the number-of-vehicles comparison processing (S40).

As the number-of-vehicles comparison processing in S40, the travel plan generation unit 14A compares the estimated number of vehicles CnVN and the maximum number of vehicles CVN. For example, the travel plan generation unit 14A determines whether the estimated number of vehicles CnVN is larger than the maximum number of vehicles CVN. When n=1, the estimated number of vehicles C1VN is there in the example shown in FIG. 6 and the maximum number of vehicles CVN is the initial value of 0. Therefore, it is determined that estimated number of vehicles CnVN is larger than the maximum number of vehicles CVN. If it is determined that the estimated number of vehicles CnVN is larger than the maximum number of vehicles CVN, the processing proceeds to the update processing (S42).

As the update processing in S42, the travel plan generation unit 14A updates the following vehicle C, which is the preceding vehicle immediately before the traveling position where the estimated number of vehicles is the maximum, and the maximum number of vehicles CVN. That is, because the estimated number of vehicles CnVN is larger than the maximum number of vehicles CVN when it is assumed that the vehicle will travel at the traveling position behind the following vehicle cn, the travel plan generation unit 14A replaces the following vehicle C, which is the preceding vehicle immediately before the traveling position where the estimated number of vehicles is the maximum, with the following vehicle cn and, at the same time, replaces the maximum number of vehicles CVN with the estimated number of vehicles CnVN. When the update processing is terminated, the processing proceeds to the increment processing (S44).

If it is determined in the number-of-vehicles comparison processing in S40 that the estimated number of vehicles CnVN is not larger than the maximum number of vehicles CVN, the update processing (S42) is skipped and the processing proceeds to the increment processing (S44).

As the increment processing in S44, the travel plan generation unit 14A adds 1 to the variable n to increment the value. When the increment processing is terminated, the processing proceeds again to the following-vehicle determination processing (S36). In this way, the processing shown in S36 to S44 is performed for each traveling position Pn behind the following vehicle cn and, as described in the update processing in S42, the maximum of the estimated number of vehicles CnVN is stored as the maximum number of vehicles CVN, and the vehicle immediately before the traveling position Pn where the estimated number of vehicles CnVN is the maximum, or the following vehicle cn, is stored as the following vehicle C that is the preceding vehicle immediately before the traveling position where the estimated number of vehicles is the maximum. If it is determined in the following-vehicle determination processing in S36 that the number of following vehicles BVN is smaller than the variable n, it is determined that the calculation of the estimated number of vehicles CnVN is finished for all traveling positions Pn and, therefore, the processing leaves the loop shown in S36 to S44. In the example shown in FIG. 6, the number of preceding vehicles at traveling position P3, or five (vehicles a2, a1, c1, c2, c3), is stored as the maximum number of vehicles CVN, and the vehicle c3 is stored as the following vehicle C. If it is determined in the following-vehicle determination processing in S36 that the number of following vehicles BVN is smaller than the variable n, the processing proceeds to the number of vehicles comparison processing (S46).

As the number of vehicles comparison processing in S46, the travel plan generation unit 14A compares the reference number of vehicles FVN and the maximum number of vehicles CVN. For example, the travel plan generation unit 14A determines whether the maximum number of vehicles CVN is larger than the reference number of vehicles FVN. If it is determined that the maximum number of vehicles CVN is larger than the reference number of vehicles FVN, the travel plan generation unit 14A determines that the traveling position of the vehicle V is the traveling position Pn where the estimated number of vehicles is the maximum (position behind the following vehicle C) (S48).

After that, the processing proceeds to the vehicle traveling control processing (S50). After that, as the vehicle traveling control processing in S50, the traveling control unit 15A controls the vehicle V so that the vehicle V travels at the traveling position determined in the processing in S48. In the example shown in FIG. 6, the traveling control unit 15A controls the vehicle V so that the vehicle V travels at the traveling position P3. For example, the travel plan generation unit 14A includes the traveling position, determined in the processing in S48, into the travel plan to allow the traveling control unit 15A to implement the control described above. The vehicle traveling control processing is performed to change the traveling position of the vehicle from the traveling position P0 to the traveling position P3 as shown in FIG. 6 and FIG. 7. After the vehicle traveling control processing is terminated, the vehicle traveling control processing shown in FIG. 8 is terminated.

On the other hand, if it is determined in the following-vehicle determination processing in S36 that there is no following vehicle with which the vehicle V can carry out vehicle-vehicle communication and if it is determined in the number of vehicles comparison processing in S46 that the maximum number of vehicles CVN is not larger than the reference number of vehicles FVN, the traveling control unit 15A controls the vehicle so that the current traveling position will be maintained. For example, the travel plan generation unit 14A includes the current traveling position into the travel plan to allow the traveling control unit 15A to implement the control described above. After the processing in S52 is terminated, the vehicle traveling control processing shown in FIG. 8 is terminated.

After the processing above, the vehicle traveling control processing shown in FIG. 8 is terminated. According to the processing shown in FIG. 8, the traveling position is determined so that the number of vehicles V ahead, with which the vehicle V can carry out vehicle-vehicle communication, is maximized and the vehicle control is performed so that the vehicle V travels at that traveling position. Therefore, the vehicle V can acquire information from more preceding vehicles.

As described above, the vehicle traveling control device 20A in the second embodiment performs the following processing. If the reference number of vehicles FVN, which is the number of preceding vehicles with which the vehicle V can carry out vehicle-vehicle communication, is smaller than the predetermined threshold Tvn and if there is at least one following vehicle with which the vehicle V can carry out vehicle-vehicle communication, the travel plan generation unit 14A calculates the number of preceding vehicles, with which the vehicle V can carry out vehicle-vehicle communication, at each traveling position behind each following vehicle on the assumption that the vehicle V will travel at that traveling position. The calculated number of preceding vehicles is the estimated number of vehicles CnVN. The traveling control unit causes the vehicle V to travel at the traveling position where the estimated number of vehicles CnVN is the maximum (CVN) and is larger than the reference number of vehicles. Therefore, the vehicle traveling control device 20A makes it possible for the vehicle V to travel at the traveling position where the number of preceding vehicles, with which the vehicle V can carry out vehicle-vehicle communication, is larger than the number of preceding vehicles at the original traveling position and is maximized, thus allowing the vehicle V to acquire information from more preceding vehicles.

Next, a vehicle traveling control device in a third embodiment is described. In the description of this embodiment, the description of the configuration and the processing similar to those in the first and second embodiments is omitted and only the difference from the first and second embodiments is described.

A vehicle traveling control device 20B in this embodiment is different from the vehicle traveling control device 20 in the first embodiment only in the function of the travel plan generation unit 14 and the traveling control unit 15 of the ECU 10.

A travel plan generation unit 14B calculates the estimated number of vehicles CnVN in the same manner as the travel plan generation unit 14A in the second embodiment if the reference number of vehicles FVN, which is the number of preceding vehicles with which the vehicle V can carry out vehicle-vehicle communication, is smaller than the predetermined threshold Tvn and if there is at least one following vehicle behind the vehicle V with which the vehicle V can carry out vehicle-vehicle communication. As in the second embodiment, the predetermined threshold is a threshold defined in advance for determining whether the number of preceding vehicles that provide information to the vehicle V is insufficient for performing the vehicle control or the driving assistance of the vehicle V, that is, whether there is a need to change the traveling position.

The travel plan generation unit 14B calculates the estimated number of vehicles CnVN in the same manner as the travel plan generation unit 14A in the second embodiment. That is, for each traveling position Pn behind each following vehicle that is present behind the vehicle V, the travel plan generation unit 14B calculates the number of preceding vehicles with which the vehicle V can carry out vehicle-vehicle communication on the assumption that the vehicle V will travel at that traveling position.

After that, the travel plan generation unit 14B determines the traveling position where the estimated number of vehicles CnVN is equal to or larger than the predetermined threshold Tvn. For example, in the example shown in FIG. 6, assume that the number of the preceding vehicles is three when the vehicle V travels at the traveling position P1, that the number of the preceding vehicles is four when the vehicle V travels at the traveling position P2, that the number of the preceding vehicles is five when the vehicle V travels at the traveling position P3, and that the number of the preceding vehicles is four when the vehicle V travels at the traveling position P4. In this case, when the predetermined threshold Tvn is five, the travel plan generation unit 14B determines that the traveling position where the estimated number of vehicles CnVN is equal to or larger than the predetermined threshold Tvn is the traveling position P3.

If there is a plurality of traveling positions where the estimated number of vehicles CnVN is equal to or larger than the predetermined threshold Tvn, the travel plan generation unit 14B selects one of the following vehicles according to a predetermined rule. For example, the traveling position nearest to the vehicle V may be selected or the traveling position most distant from the vehicle V may be selected. Instead, the travel plan generation unit 14B may perform the processing of calculating the estimated number of vehicles CnVN and the processing of comparing it with the predetermined threshold Tvn for each traveling position. That is, a series of processing, in which the estimated number of vehicles CnVN at a traveling position is calculated and the calculated estimated number of vehicles CnVN and the predetermined threshold Tvn are compared, may be performed until a traveling position is found where the estimated number of vehicles CnVN becomes equal to or larger than the predetermined threshold Tvn. In any case, the travel plan generation unit 14B can determine the traveling position where the estimated number of vehicles CnVN is equal to or larger than the predetermined threshold Tvn.

After that, the travel plan generation unit 14B generates a travel plan that causes the vehicle V to travel at the traveling position where the estimated number of vehicles CnVN is equal to or larger than the predetermined threshold Tvn. Based on the travel plan generated by the travel plan generation unit 14B, a traveling control unit 15B outputs the control signal to the actuator 7 for controlling the traveling of the vehicle V. In the example shown in FIG. 6, the traveling control unit 15B performs control so that the vehicle V travels at the traveling position P3. For example, the travel plan generation unit 14B includes the traveling position P3 into the travel plan to allow the traveling control unit 15B to implement the control described above. When the vehicle traveling control processing is performed, the traveling position of the vehicle is changed from the traveling position P0 to the traveling position P3 as shown in FIGS. 6 and 7. After the traveling position is changed in this way, the traveling control unit 15B causes the vehicle V to travel at the traveling position where the estimated number of vehicles CnVN is equal to or larger than the predetermined threshold Tvn. In this manner, the traveling control unit 15B allows the vehicle V to travel at the traveling position where the number of preceding vehicles, with which the vehicle V can carry out vehicle-vehicle communication, becomes larger than that at the original traveling position and where the minimum amount of information, required to perform the vehicle control or the driving assistance of the vehicle V, can be acquired from the preceding vehicles with which the vehicle V can carry out vehicle-vehicle communication.

Figure 9:
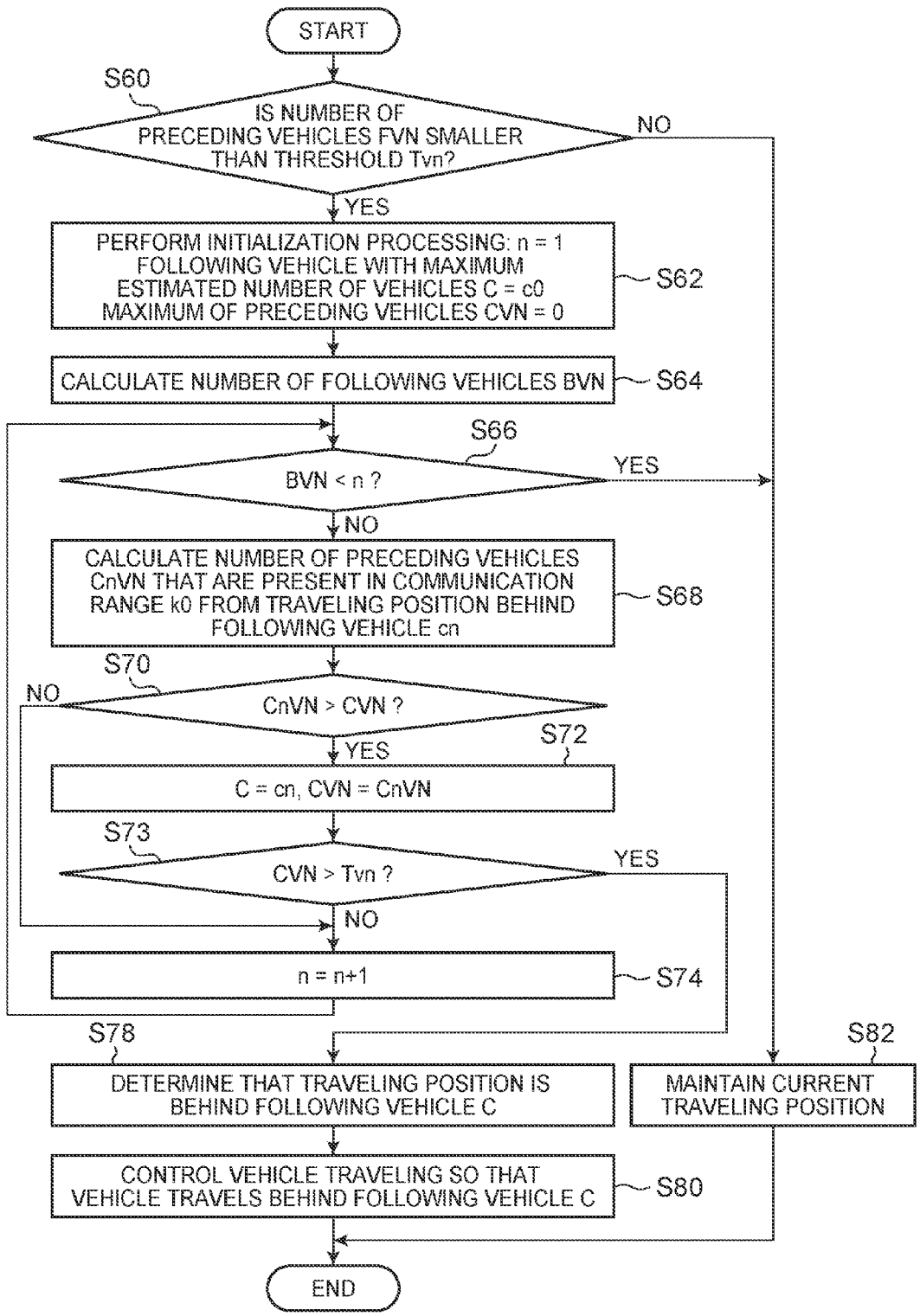
FIG. 9 is a flowchart showing an example of the vehicle traveling control processing in a third embodiment.

Next, the vehicle traveling control processing performed by the vehicle traveling control device 20B is described. FIG. 9 is a flowchart showing an example of the vehicle traveling control processing in the third embodiment. The vehicle traveling control processing shown in FIG. 9 is performed, for example, when the autonomous driving start request operation is input via the autonomous driving ON/OFF switch.

The flowchart shown in FIG. 9 is similar to the flowchart shown in FIG. 8 except that the number of vehicles comparison processing in S46 is omitted and that the threshold determination processing in S73 is added. The other processing is the same as that in the flowchart in FIG. 8. That is, reference-number-of-vehicles determination processing in S60 is the same that in S30. The initialization processing in S62 is the same as that in S32. The number-of-following-vehicles calculation processing in S64 is the same as that in S34. The following-vehicle determination processing in S66 performs the determination similar to that in S36; that is, if the determination is negative, the processing proceeds to the estimated-number-of-vehicles calculation processing in S68 and, if the determination is affirmative, the processing proceeds to S82. The processing in S82 is the same as that in S52. The estimated-number-of-vehicles calculation processing in S68 is the same as that in S38. The number-of-vehicles comparison processing in S70 is the same as that in S40. The update processing in S72 performs the same calculation as that in S42. After the calculation, the processing proceeds to the threshold determination processing in S73.

The threshold determination processing in S73 is described. As the threshold determination processing in S73, the travel plan generation unit 14B compares the maximum number of vehicles CVN and the predetermined threshold Tvn. For example, the travel plan generation unit 14B determines whether the maximum number of vehicles CVN is larger than the predetermined threshold Tvn. If it is determined that the maximum number of vehicles CVN is larger than the predetermined threshold Tvn, the traveling position is determined to be the traveling position to which the vehicle is to move (position behind the following vehicle C) (S78). After that, the processing proceeds to the vehicle traveling control processing (S80). The vehicle traveling control processing in S80 is the same as that in S50.

If it is determined that the maximum number of vehicles CVN is not larger than the predetermined threshold Tvn, the processing proceeds to the increment processing (S74). The increment processing in S74 is the same as that is S44.

In the flowchart shown in FIG. 9, the processing shown in S66 to S74 is performed for each traveling position Pn behind the following vehicle cn as described above. In the update processing in S72, the maximum of the estimated number of vehicles CnVN is stored as the maximum number of vehicles CVN, and the vehicle immediately before the traveling position Pn where the estimated number of vehicles CnVN is the maximum, or the following vehicle cn, is stored as the following vehicle C that is the preceding vehicle immediately before the traveling position where the estimated number of vehicles is the maximum. If it is determined in the threshold determination processing in S73 that the maximum number of vehicles CVN is larger than the predetermined threshold Tvn, the traveling position is found where the number of preceding vehicles, with which the vehicle V can carry out vehicle-vehicle communication, becomes larger than the number of preceding vehicles at the original traveling position and where the minimum amount of information, required to perform the vehicle control or the driving assistance of the vehicle V, can be acquired from the preceding vehicles with which the vehicle V can carry out vehicle-vehicle communication.

Therefore, the processing leaves the loop shown in S66 to S74. By performing the processing shown in FIG. 9, the traveling position is determined so that the number of preceding vehicles, with which the vehicle V can carry out vehicle-vehicle communication, becomes larger than the number of preceding vehicles at the original traveling position and so that the minimum amount of information, required to perform the vehicle control or the driving assistance of the vehicle V, can be acquired from the preceding vehicles with which the vehicle V can carry out vehicle-vehicle communication. After that, the vehicle control is performed to allow the vehicle V to travel at that traveling position. Therefore, the vehicle V can acquire information from more preceding vehicles.

As described above, the vehicle traveling control device 20B in the third embodiment performs the processing as follows. If the reference number of vehicles FVN, which is the number of preceding vehicles with which the vehicle V can carry out vehicle-vehicle communication, is smaller than the predetermined threshold Tvn and if there is at least one following vehicle with which the vehicle V can carry out vehicle-vehicle communication, the travel plan generation unit 14B calculates the number of preceding vehicles, with which the vehicle V can carry out vehicle-vehicle communication, at each traveling position behind each following vehicle on the assumption that the vehicle V will travel at that traveling position. The calculated number of preceding vehicles is the estimated number of vehicles CnVN. The traveling control unit 15B causes the vehicle V to travel at the traveling position where the estimated number of vehicles CnVN is equal to or larger than the predetermined threshold Tvn. Therefore, the vehicle traveling control device 20B makes it possible for the vehicle V to travel at the traveling position where the number of preceding vehicles, with which the vehicle V can carry out vehicle-vehicle communication, is larger than the number of preceding vehicles at the original traveling position and where the minimum amount of information, required to perform the vehicle control or the driving assistance of the vehicle V, can be acquired from the preceding vehicles with which the vehicle V can carry out vehicle-vehicle communication, thus allowing the vehicle V to acquire information from more preceding vehicles.

Next, a vehicle traveling control device in a fourth embodiment is described. In the description of this embodiment, the description of the configuration and the processing similar to those in the first to third embodiments is omitted and only the difference from the first to third embodiments is described.

A vehicle traveling control device 20C in this embodiment is different from the vehicle traveling control device in the first to third embodiments in a part of the function of the external situation recognition unit 12 and the travel plan generation unit 14. The other functions are the same as those in the first to third embodiments. In addition to the functions of the vehicle traveling control device in the first to third embodiments, the vehicle traveling control device 20C has the function to change the communication range according to the traveling positions of the other vehicles around the vehicle V.

An external situation recognition unit 12C (an example of the position information acquisition unit and an example of the vehicle type information acquisition unit) further acquires the position information on the other vehicles around the vehicle V. The other vehicles are not limited to those with which the vehicle V can carry out vehicle-vehicle communication but include all vehicles around the vehicle V. The external situation recognition unit 12C acquires the position information and the vehicle type information on the other vehicles based on the detection result of the external sensor 1. The vehicle type information is the information indicating the vehicle type or the vehicle size. For example, the vehicle type information is the information on the type such as a truck, a station wagon, or a passenger car or the information on the size such as a large-sized vehicle, a medium-sized vehicle, and a small-sized vehicle. The external situation recognition unit 12C may cause the communication unit 5, which carries out vehicle-to-vehicle communication, to operate to acquire the detection result of the external sensor 1 acquired by the vehicles around the vehicle V with which the vehicle V can carry out vehicle-vehicle communication. Based on the acquired information, the external situation recognition unit 12C acquires the position information and the vehicle type information on the other vehicles. Instead of this, the external situation recognition unit 12C may cause the communication unit, which carries out road-vehicle communication, to operate to acquire the position information and the vehicle type information on the other vehicles around the vehicle V.

Like the travel plan generation unit in the first to third embodiments, a travel plan generation unit 14C calculates the reference number of vehicles FVN and the estimated number of vehicles CnVN, based on the position information, obtained by the external situation recognition unit 12C, on the vehicles around the vehicle V with which the vehicle V can carry out vehicle-vehicle communication and based on the communication range of the communication unit 5. For each traveling position, the travel plan generation unit 14C changes the communication range of the communication unit 5, which is used for the calculation of the reference number of vehicles FVN and the estimated number of vehicles CnVN, using the position information and the vehicle type information on the other vehicles.

Figure 10:
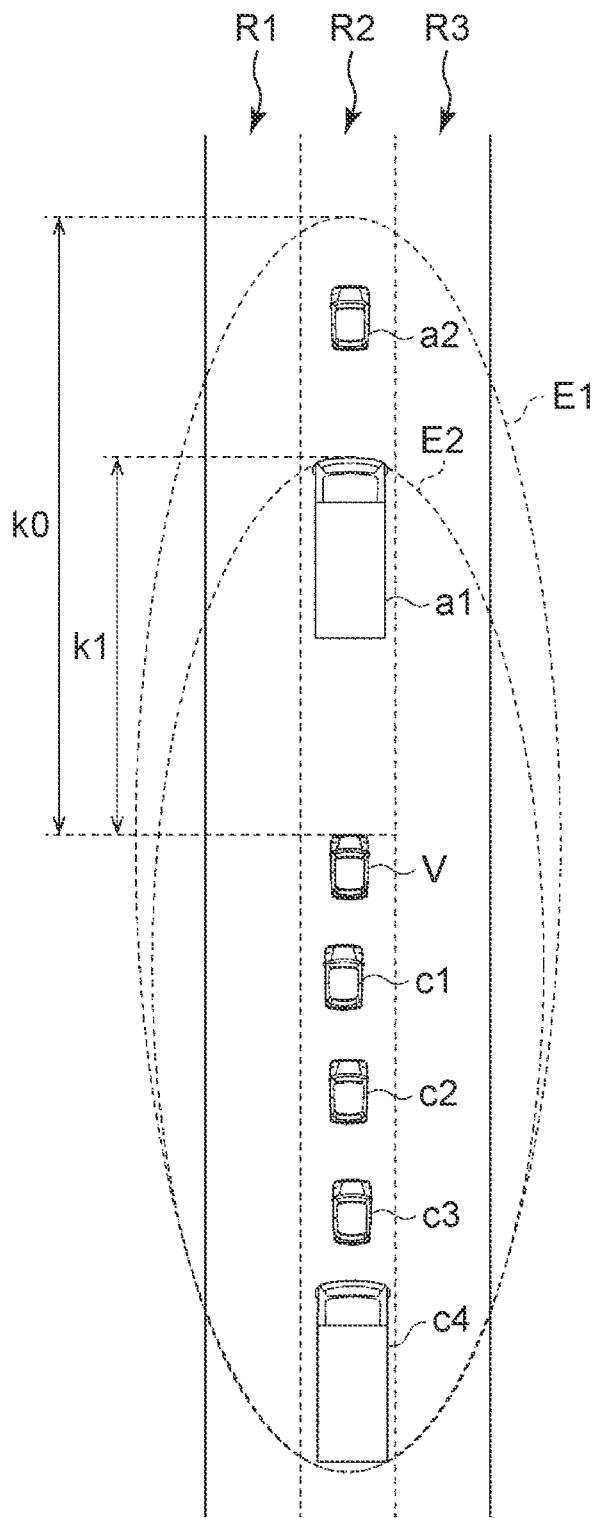
FIG. 10 is a diagram showing an example of a change in the communication range according to a difference in the size of the preceding vehicle.

FIG. 10 is a diagram showing an example of a change in the communication range according to the difference in the type (vehicle size) of the preceding vehicle. In FIG. 10, the vehicle V is traveling at the traveling position P0 on the road in which there are three lanes (lanes R1, R2, R3) in each direction. There is a total of two preceding vehicles (vehicles a2 and a1) ahead of the vehicle V with which the vehicle V can carry out vehicle-vehicle communication. There is a total of four following vehicles (vehicles c1 to c4) behind the vehicle V with which the vehicle V can carry out vehicle-vehicle communication. The communication range E1 before the change is stored in advance in the storage unit 16 of the ECU 10. FIG. 10 shows the communication range E1 that extends a distance of k0 ahead in the traveling direction of the vehicle V.

The travel plan generation unit 14C changes the communication range E1 at the traveling position P0 based on the position information and the vehicle type information on the vehicles a2 and a1 ahead of the vehicle V. For example, when the vehicle ahead is a large-sized vehicle such as a truck, the communication range E1 becomes smaller because radio waves used for vehicle-vehicle communication are blocked by the large-sized vehicle. To address this problem, the travel plan generation unit 14C makes the communication range E1 smaller as the size of the vehicle ahead is larger. In addition, the travel plan generation unit 14C may change the communication range E1 considering the number of vehicles. For example, the travel plan generation unit 14C uses the following expression to calculate the communication range k1 after the change $$k1 = k0 \cdot \Pi A_m^{Nm}$$ [Expression 1]

where k0 is the communication distance before the change, Am is the coefficient that depends on the vehicle size m (coefficient that satisfies 0<Am<1 and becomes closer to 1 as m increases), and Nm is the number of vehicles with the vehicle size of m. In this manner, the travel plan generation unit 14C makes the communication range E1 smaller. FIG. 10 shows an example in which the communication range E1 is changed to the communication range E2 and the communication distance k0 is changed to the communication distance k1. That is, the vehicle a2 is a preceding vehicle with which the vehicle V can carry out vehicle-vehicle communication when radio wave blocking is not taken into consideration, but is not when radio wave blocking is taken into consideration.

Figure 11:
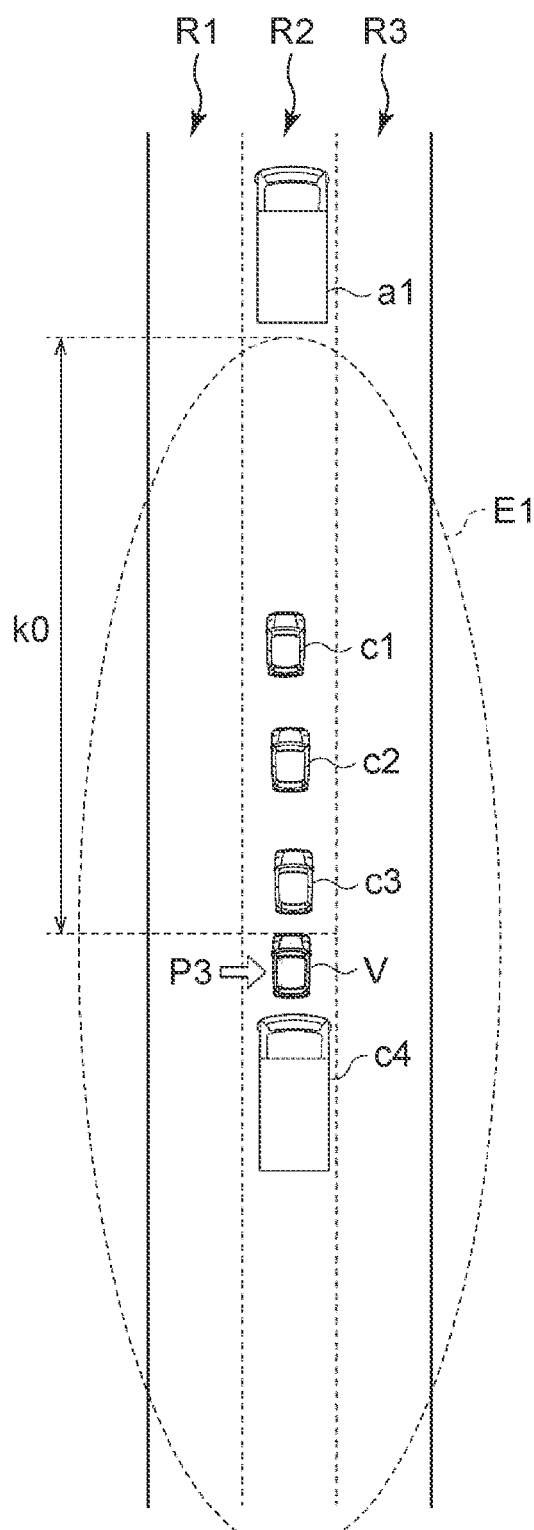
FIG. 11 is a diagram showing an example of the communication range when it is assumed that the traveling position of the vehicle shown in FIG. 10 is changed.
Figure 12:
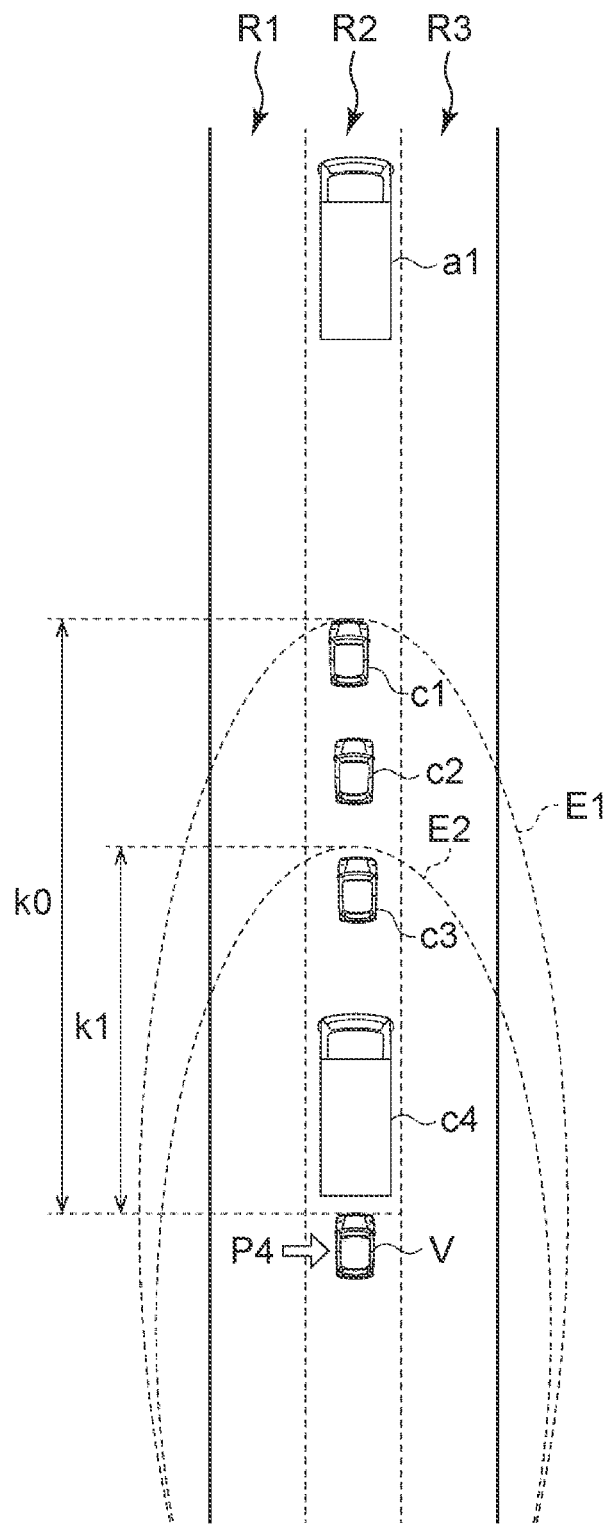
FIG. 12 is a diagram showing another example of the communication range when it is assumed that the traveling position of the vehicle shown in FIG. 10 is changed.

FIGS. 11 and 12 are diagrams showing an example of the communication range when it is assumed that the traveling position of the vehicle shown in FIG. 10 is changed. For example, when it is assumed that the vehicle V travels at the traveling position P3 behind the following vehicle c3 as shown in FIG. 11, the communication range E1 is not changed regardless of whether or not radio wave blocking is taken into consideration because the preceding vehicles are small-sized vehicles c1 to c3. Therefore, the number of the preceding vehicles with which the vehicle V can carry out vehicle-vehicle communication is three. On the other hand, when it is assumed that the vehicle V travels at the traveling position P4 behind the following vehicle c4 as shown in FIG. 12, the preceding vehicles include the large-sized vehicle c4. In the example shown in FIG. 12, the number of preceding vehicles with which the vehicle V can carry out vehicle-vehicle communication is four when radio wave blocking is not taken into consideration. Therefore, the vehicle traveling control device in the first to third embodiments selects the traveling position P4 as the traveling position of the vehicle V. On the other hand, in the example shown in FIG. 12, the number of preceding vehicles with which the vehicle V can carry out vehicle-vehicle communication is two when radio wave blocking is taken into consideration. Therefore, the vehicle traveling control device 20C in the fourth embodiment selects the traveling position P3 as the traveling position of the vehicle V.

As described above, the vehicle traveling control device 20C in the fourth embodiment performs the processing as follows. That is, the external situation recognition unit 12C acquires the vehicle type information on the other vehicles around the vehicle V and further acquires the position information on the other vehicles around the vehicle V. The travel plan generation unit 14C uses the position information and the vehicle type information on the other vehicles to change the communication range E1 for each traveling position Pn, thus increasing accuracy in the reference number of vehicles FVN and the estimated number of vehicles CnVN.

While the embodiments of the present invention have been described, it is to be understood that the present invention is not limited to the embodiments above. The present invention may be implemented not only by the above-described embodiments but also in various modes in which various changes and modifications are added based on the knowledge of those skilled in the art.

The embodiments described above may be performed by combining among them in various ways.

In the embodiments described above, an example is described in which the travel plan of the vehicle V is determined based on the external situation (traveling positions of other vehicles with which the vehicle V can carry out vehicle-vehicle communication) at the current time. Instead of this, when selecting a route to the destination, the travel plan generation unit 14 may be configured to preferentially select a route where there are many vehicles with which the vehicle V can carry out vehicle-vehicle communication or a route that includes the geographical features where radio wave locking is unlikely to occur (plain area rather than mountainous area). For example, when there is a plurality of routes to the destination, the travel plan generation unit 14 calculates the priority, which is higher as there are more vehicles with which the vehicle V can carry out vehicle-vehicle communication, for each route and employs the highest-priority route. The vehicle traveling control device configured in this way allows information to be acquired from even more preceding vehicles.

The above embodiments describe that the vehicle system 100 acquires the information, acquired by the preceding vehicles traveling ahead in the traveling direction of the vehicle V, via vehicle-vehicle communication for use in the driving assistance and the traveling control. The following describes an example of the driving assistance or the traveling control of the vehicle system 100.

Figure 13A:
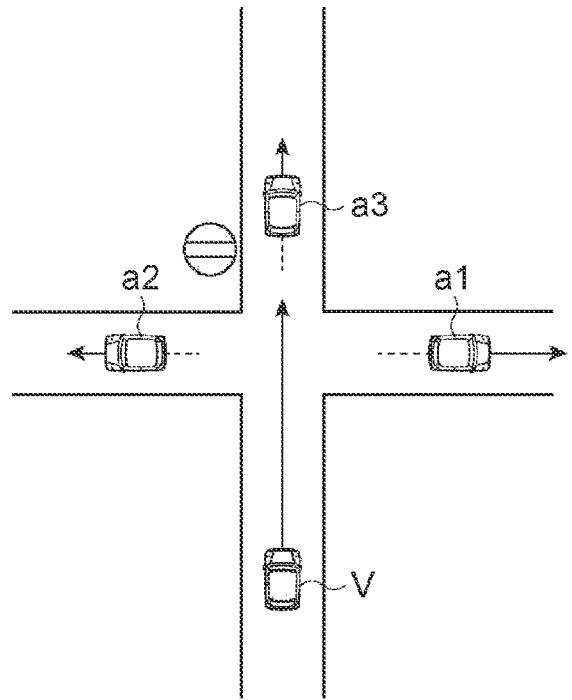
FIG. 13A is a diagram showing the driving assistance or traveling control of a vehicle system.
Figure 13B:
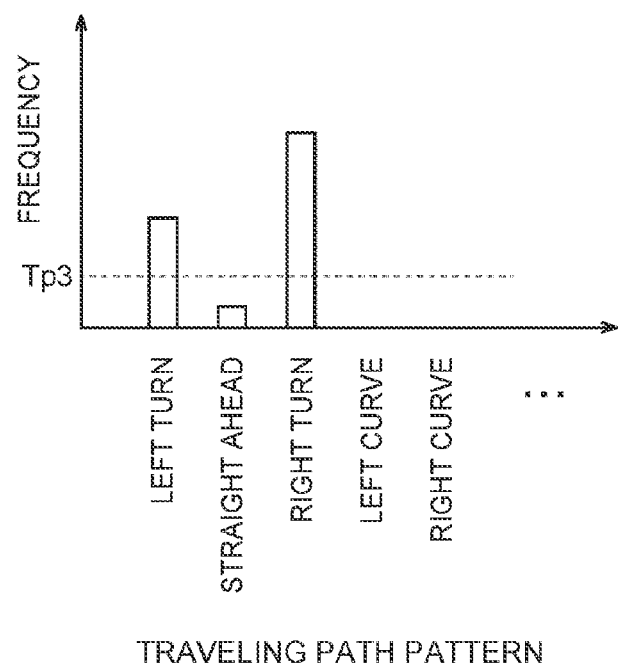
FIG. 13B is a diagram showing the driving assistance or traveling control of the vehicle system.

FIG. 13A and FIG. 13B are diagrams showing the driving assistance or traveling control of the vehicle system 100. FIG. 13A shows a scene in which the vehicle V is going to enter an intersection. As shown in FIG. 13A, only the right/left turn is permitted lawfully, and entry into the straight-ahead road is prohibited, at the intersection. The vehicle system 100 recognizes the traveling route of the preceding vehicle based on the external situation recognition unit, which recognizes the external situation using the result of vehicles-vehicle communication, and on the map database 4. The traveling route can be recognized by the steering angle, vehicle speed, and yaw rate of the preceding vehicle.

FIG. 13B shows the frequency of preceding-vehicle behaviors at the four-road junction shown in FIG. 13A. As shown in FIG. 13B, most vehicles turn right or left because traveling straight ahead is prohibited at the four-road junction. However, there may be a vehicle, such as the preceding vehicle a3, that mistakenly travels ahead. In such a case, the vehicle system 100 references the map database 4 to determine that entry into the straight-ahead at the four-road junction is prohibited and detects that the preceding vehicle a3 has missed "No Entry" and has continued traveling.

However, in some cases, it is determined that entry into the straight-ahead road at the four-road junction is permitted in the map database 4 due to a delay in updating the map database 4. In such a case, the vehicle system 100 cannot determine that the preceding vehicle a3 has mistakenly traveled straight ahead, with the result that the vehicle system 100 may perform driving assistance or travel control to cause the vehicle V to follow the preceding vehicle a3. To address this problem, the frequency of behaviors of the preceding vehicles is determined using the predetermined threshold Tp1 as shown in FIG. 13B for narrowing down the paths, which can be selected at the four-road junction, to the right/left turn. Then, by comparing the results before and after the narrowing-down, the vehicle system 100 can recognize that the preceding vehicle a3 is mistakenly traveling or that the map database 4 includes an error. If the number of preceding vehicles is equal to or lower than the predetermined threshold Tv1, the vehicle system 100 may determine that mismatch is caused by unreliable information.

If the results before and after the narrowing-down do not match as described above, the reliability of the information on the preceding vehicle a3 may be low or the reliability of the information in the map database 4 may be low. Therefore, if the results before and after the narrowing-down do not match, the vehicle system 100 may lower the control level of autonomous driving or may perform processing to switch autonomous driving to manual driving. On the other hand, if the results before and after the narrowing-down match, the vehicle system 100 maintains the control level of autonomous driving.

Figure 14A:
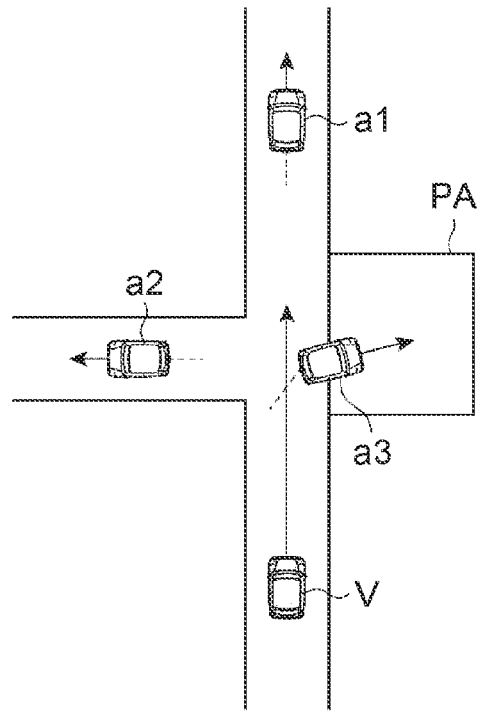
FIG. 14A is a diagram showing the driving assistance or traveling control of the vehicle system.
Figure 14B:
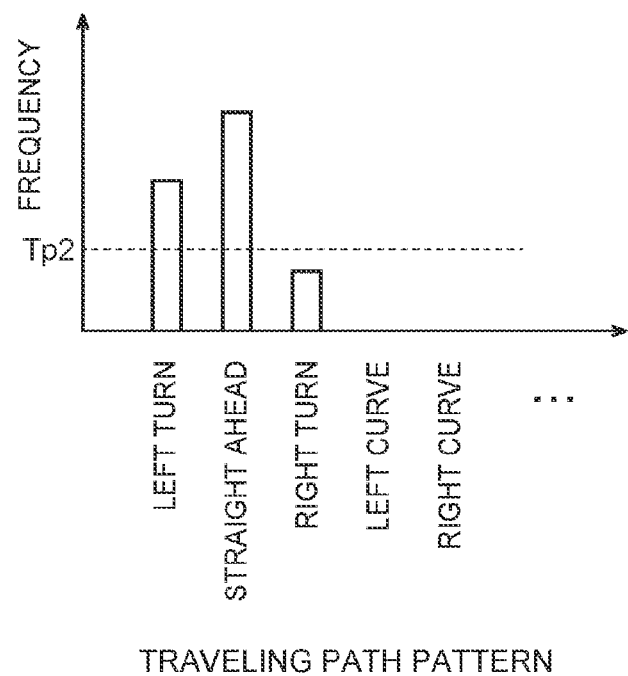
FIG. 14B is a diagram showing the driving assistance or raveling control of the vehicle system.

The description described above is applicable to a scene other than a four-road junction. FIG. 14A and FIG. 14B are diagrams showing the driving assistance or traveling control of the vehicle system 100. FIG. 14A shows a scene in which the vehicle V is going to enter a three-road junction. As shown in FIG. 14A, the vehicle can only travel straight ahead or turn left in the three-road junction but can turn right only when the vehicle V enters the parking lot PA. FIG. 14B shows the frequency of the behaviors of the preceding vehicles at the T junction shown in FIG. 14A. As shown in FIG. 14B, most vehicles travel straight ahead or turn left because there is no road in the right-turn direction at this three-road junction. However, in some cases, there is a vehicle, such as the preceding vehicle a3, that turns right. In such a case, the vehicle system 100 references the map database 4 and determines whether there is a road in the right-turn direction at this three-road junction. By doing so, the vehicle system 100 can detect that the preceding vehicle a3 has departed from the road and has turned right for parking.

However, in some cases, it is determined that there is a road in the right-turn direction at the three-road junction in the map database 4 due to a delay in updating the map database 4. In such a case, the vehicle system 100 cannot determine that the preceding vehicle a3 has turned right for parking in the parking lot PA, with the result that the vehicle system 100 may perform driving assistance or travel control to cause the vehicle V to follow the preceding vehicle a3. To address this problem, the frequency of behaviors of the preceding vehicles is determined using the predetermined threshold Tp2 as shown in FIG. 14B for narrowing down the paths at the three-road junction to the road straight ahead and the road in the left direction. Then, by comparing the results before and after the narrowing-down, the vehicle system 100 can recognize that the preceding vehicle a3 has departed from the road or that the map database 4 includes an error.

The predetermined thresholds Tp1 and Tv1 used in the determination in the scene of a four-road junction and the predetermined thresholds Tp2 and Tv2 used in the determination in the scene of a three-road junction may be different values. That is, these thresholds may be set appropriately for each road shape. For example, the predetermined threshold Tpn in a straight region may be the maximum value with the predetermined threshold Tpn decreasing as the number of roads at a junction increases (three-road junction, four-road junction, and so on). In contrast, the predetermined threshold Tvn in a straight region may be the minimum value with the predetermined threshold Tvn increasing as the number of roads at a junction increases (three-road junction, four-roads junction and so on). In addition, these thresholds may be defined, not for each road shape, but for each place.

In the embodiments described above, though an example is described in which the vehicle traveling control device is included in the vehicle system 100 that performs autonomous driving, the general autonomous driving function is not always required in the present invention. Only the ability to recognize the external situation and to cause the vehicle V to travel at a traveling position, where there are more preceding vehicles with which the vehicle V can carry out vehicle-vehicle communication, is necessary and sufficient to implement the present invention.

In the embodiments described above, not only the communication unit 5 that carries out vehicle-vehicle communication but also a communication unit that carries out road-vehicle communication may be provided to acquire the position information and the vehicle information on the preceding vehicles via communication with a computer in the facilities such as the information management center that manages the traffic information. For example, the information may be acquired via road-vehicle communication with a roadside transmitter receiver (for example, optical beacon, Intelligent Transport Systems (ITS), etc.) provided on a roadside.

What is claimed is:

1. A vehicle traveling control device comprising:
a communication unit configured to carry out vehicle-vehicle communication with preceding vehicles;
a position information acquisition unit configured to acquire position information on the preceding vehicles and following vehicles around a host vehicle, the host vehicle being able to carry out vehicle-vehicle communication with the preceding vehicles;
a number of vehicles calculation unit configured to calculate a reference number of vehicles and an estimated number of vehicles based on the position information acquired by the position information acquisition unit and a communication range of the communication unit, the reference number of vehicles being a number of the preceding vehicles with which the host vehicle can carry out vehicle-vehicle communication, the estimated number of vehicles being a number of the preceding vehicles with which the host vehicle can carry out vehicle-vehicle communication, the estimated number of vehicles being a number of the preceding vehicles determined using the assumption that the host vehicle will travel at a traveling position behind each of the following vehicles; and
a traveling control unit configured to cause the host vehicle to travel at the traveling position behind the following vehicle if the estimated number of vehicles is larger than the reference number of vehicles.

2. A vehicle traveling control device comprising:
a communication unit configured to carry out vehicle-vehicle communication with preceding vehicles;
a position information acquisition unit configured to acquire position information on the preceding vehicles and following vehicles around a host vehicle, the host vehicle being able to carry out vehicle-vehicle communication with the preceding vehicles;
a number of vehicles calculation unit configured to calculate a number of the preceding vehicles with which the host vehicle can carry out vehicle-vehicle communication based on the position information acquired by the position information acquisition unit and a communication range of the communication unit; and
a traveling control unit configured to cause the host vehicle to travel based on a calculation result of the number of vehicles calculation unit wherein
the number of vehicles calculation unit is configured to calculate an estimated number of vehicles if a reference number of vehicles is smaller than a predetermined threshold and if there is at least one following vehicle with which the host vehicle can carry out vehicle-vehicle communication, the reference number of vehicles being a number of the preceding vehicles with which the host vehicle can carry out vehicle-vehicle communication, the estimated number of vehicles being a number of the preceding vehicles, with which the host vehicle can carry out vehicle-vehicle communication, the estimated number of vehicles being a number of the preceding vehicles determined using the assumption that, at a traveling position behind each of the following vehicles, the host vehicle will travel at the traveling position, and
the traveling control unit is configured to cause the host vehicle to travel at the traveling position where the estimated number of vehicles is a maximum and is larger than the reference number of vehicles, or at the traveling position where the estimated number of vehicles is equal to or larger than the predetermined threshold.

3. The vehicle traveling control device according to claim 1 further comprising a vehicle type information acquisition unit configured to acquire vehicle type information on other vehicles around the host vehicle wherein
the position information acquisition unit is configured to further acquire position information on the other vehicles around the host vehicle and the number of vehicles calculation unit is configured to change the communication range using the position information and vehicle type information on the other vehicles.

4. The vehicle traveling control device according to claim 2 further comprising a vehicle type information acquisition unit configured to acquire vehicle type information on other vehicles around the host vehicle wherein
  the position information acquisition unit is configured to further acquire position information on the other vehicles around the host vehicle and
  the number of vehicles calculation unit is configured to change the communication range using the position information and vehicle type information on the other vehicles.

* * * * *